United States Patent
Parish et al.

(10) Patent No.: US 9,988,221 B2
(45) Date of Patent: Jun. 5, 2018

(54) CARRIER BRAKE FOR PNEUMATIC TRANSPORT SYSTEM

(71) Applicant: TRANSLOGIC CORPORATION, Denver, CO (US)

(72) Inventors: David Warren Parish, Denver, CO (US); Daniel John Serafin, Thornton, CO (US); Ralph Charles Poplawsky, Littleton, CO (US)

(73) Assignee: TRANSLOGIC CORPORATION, Denver, CO (US)

( * ) Notice: Subject to any disclaimer, the term of this patent is extended or adjusted under 35 U.S.C. 154(b) by 0 days. days.

(21) Appl. No.: 14/966,782

(22) Filed: Dec. 11, 2015

(65) Prior Publication Data

US 2016/0244274 A1    Aug. 25, 2016

Related U.S. Application Data

(60) Provisional application No. 62/090,725, filed on Dec. 11, 2014.

(51) Int. Cl.
 *B65G 51/20* (2006.01)
 *B65G 51/36* (2006.01)

(52) U.S. Cl.
 CPC ............ *B65G 51/20* (2013.01); *B65G 51/36* (2013.01); *B65G 2205/06* (2013.01)

(58) Field of Classification Search
 CPC ............................ B65G 51/20; B65G 2205/06
 USPC ............................................................ 406/84
 See application file for complete search history.

(56) References Cited

U.S. PATENT DOCUMENTS

| | | | | |
|---|---|---|---|---|
| 923,458 | A | * | 6/1909 | Stoddard ................ B65G 51/03  406/177 |
| 2,761,633 | A | | 9/1956 | Sindzinski |
| 3,101,183 | A | * | 8/1963 | Hunter ................... B65G 51/04  406/193 |
| 3,104,078 | A | * | 9/1963 | Buchwald .............. B65G 51/32  406/110 |
| 3,148,845 | A | * | 9/1964 | Buchwald ............. B61B 13/122  406/105 |
| 3,976,264 | A | | 8/1976 | Ekama et al. |
| 4,135,685 | A | * | 1/1979 | Girshovich ............ B65G 51/20  406/10 |
| 4,240,768 | A | * | 12/1980 | Carstens ................ B65G 51/10  406/105 |
| 4,256,418 | A | * | 3/1981 | Stangl .................... B65G 51/32  406/112 |
| 4,831,540 | A | * | 5/1989 | Hesser ...................... B07C 3/12  700/113 |
| 4,960,350 | A | * | 10/1990 | Tsubata .................. B65G 51/02  406/83 |
| 4,971,481 | A | | 11/1990 | Foreman |
| 5,562,367 | A | * | 10/1996 | Scott ...................... B65G 51/34  406/112 |

(Continued)

Primary Examiner — Joseph Dillon, Jr.
(74) Attorney, Agent, or Firm — Marsh Fischmann & Breyfogle LLP; Russell T. Manning

(57) ABSTRACT

The present application discloses braking devices for use in a pneumatic tube system (PTS). The braking devices are adapted for in-line incorporation with a pneumatic tube and are operative to stop a pneumatic carrier within a pneumatic carrier system. The in-line braking devices allow for decelerating a carrier to a stop over a distance to reduce the forces applied to a carrier and its contents.

6 Claims, 32 Drawing Sheets

(56) References Cited

U.S. PATENT DOCUMENTS

| | | | | |
|---|---|---|---|---|
| 6,068,428 | A * | 5/2000 | Nair | B65G 51/01 |
| | | | | 406/109 |
| 6,322,295 | B1 * | 11/2001 | Gabriele | B65G 51/02 |
| | | | | 406/151 |
| 6,659,693 | B1 * | 12/2003 | Perkins | B65G 51/24 |
| | | | | 406/13 |
| 6,702,150 | B2 * | 3/2004 | Sumetzberger | B65G 51/32 |
| | | | | 221/265 |
| 6,939,088 | B2 * | 9/2005 | Farrell | B65G 51/36 |
| | | | | 406/184 |
| 7,326,005 | B1 | 2/2008 | Castro et al. | |
| 7,424,340 | B2 * | 9/2008 | Owens | B65G 51/46 |
| | | | | 406/182 |
| 8,317,432 | B2 * | 11/2012 | Castro | B65G 51/12 |
| | | | | 406/183 |
| 8,382,401 | B2 * | 2/2013 | Castro | B65G 51/20 |
| | | | | 406/195 |
| 2008/0298907 | A1 * | 12/2008 | Scott | B65G 51/32 |
| | | | | 406/154 |
| 2010/0111617 | A1 * | 5/2010 | Castro | B65G 51/20 |
| | | | | 406/183 |
| 2010/0221074 | A1 | 9/2010 | Castro | |

* cited by examiner

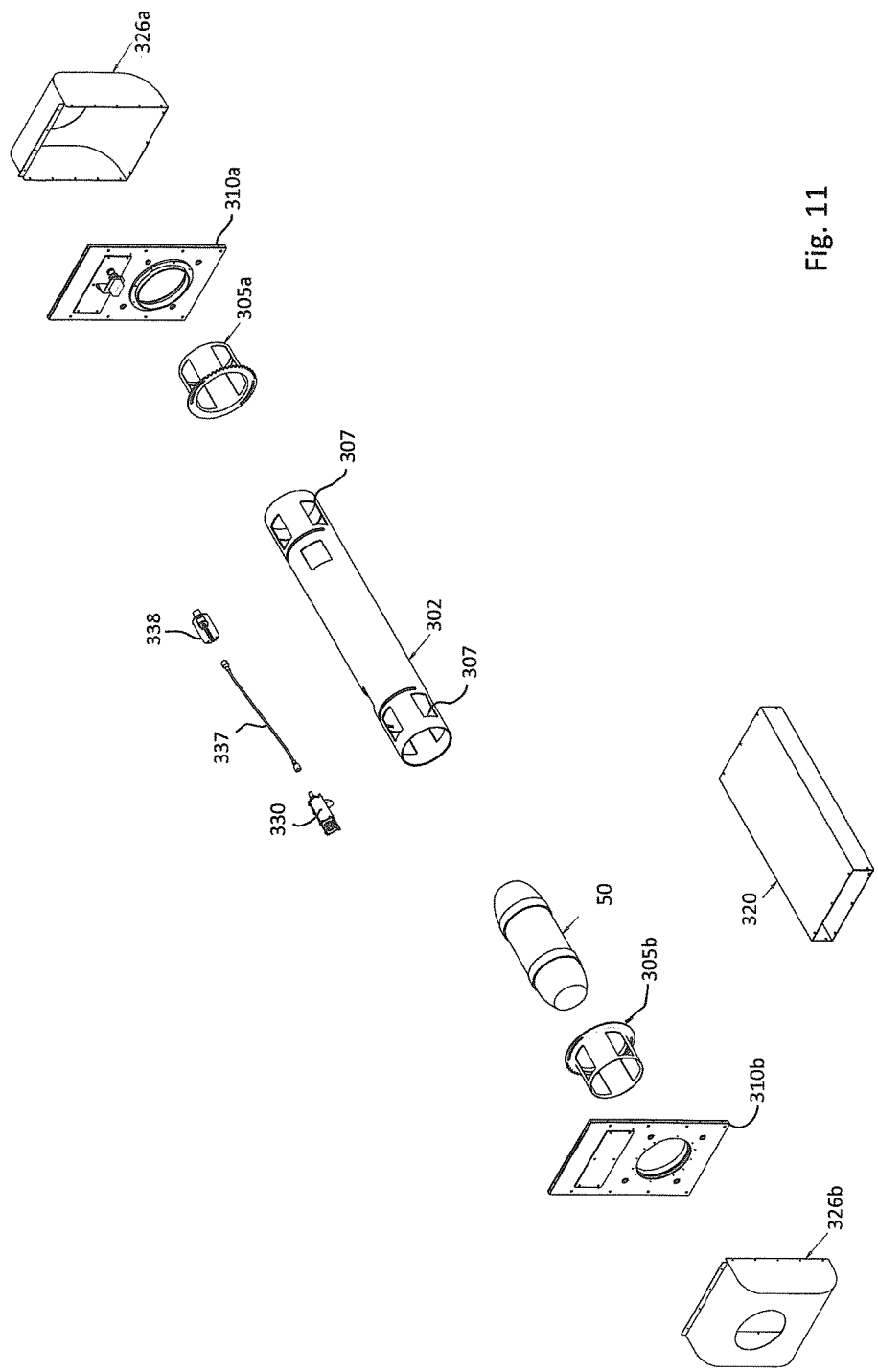

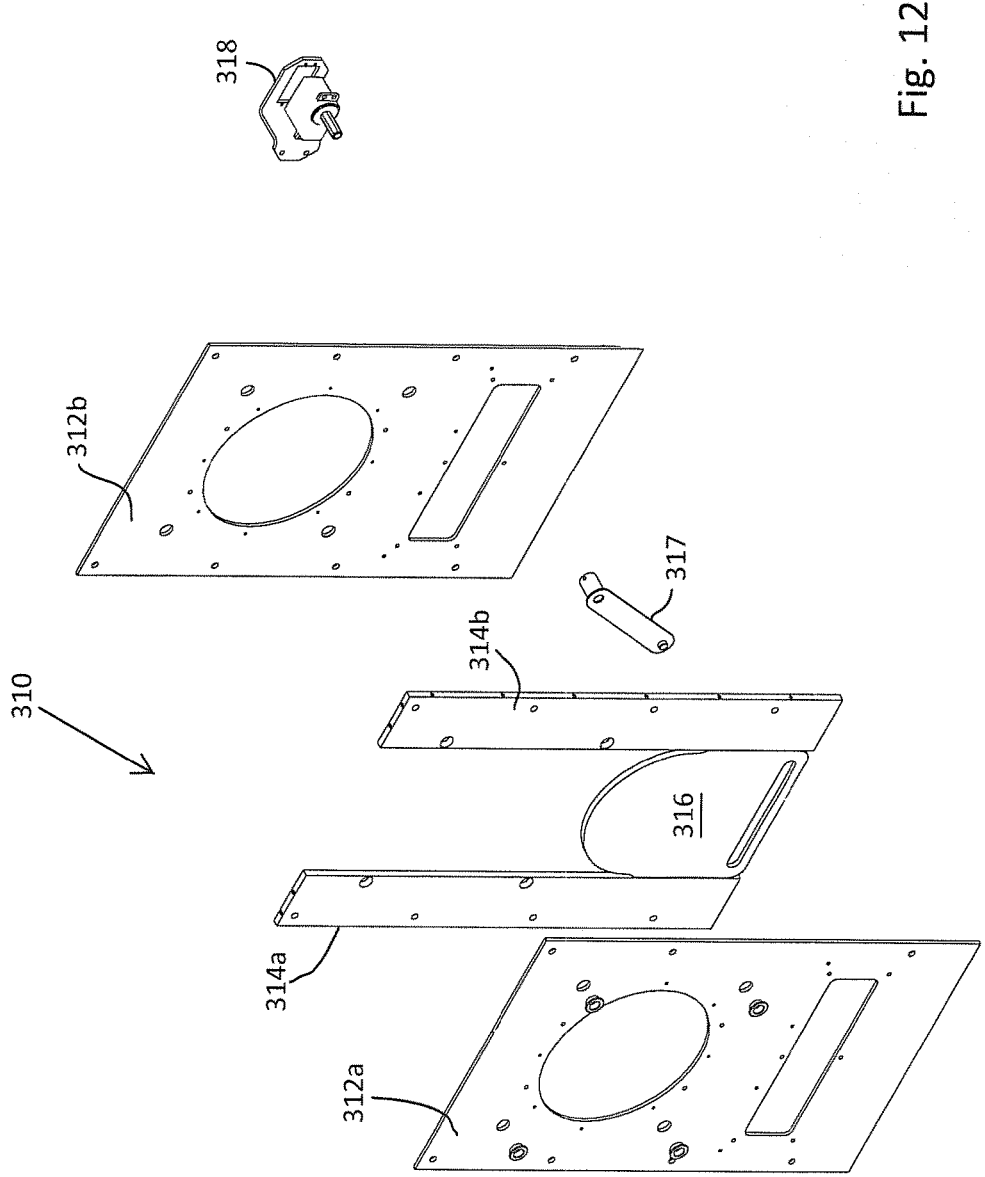

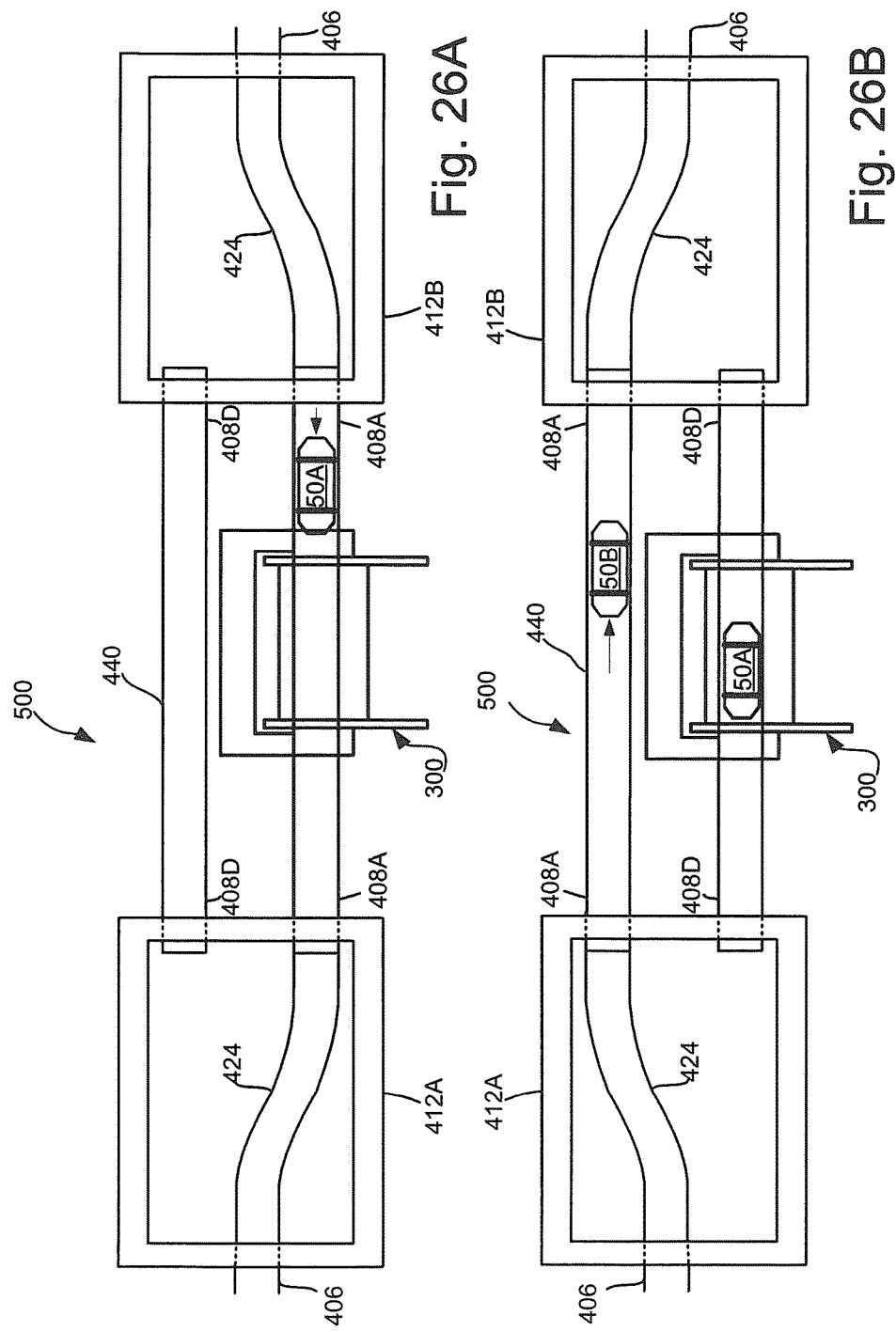

CARRIER BRAKE FOR PNEUMATIC TRANSPORT SYSTEM

CROSS REFERENCE

The present application claims the benefit of the filing date of U.S. Provisional Application No. 62/090,725 having a filing date of Dec. 11, 2014, the entire contents of which is incorporated herein by reference.

FIELD

The presented disclosure relates generally to pneumatic tube systems. More particularly, the presented inventions relate to systems and methods for slowing, stopping and reinitiating movement of a pneumatic carrier in a pneumatic tube system.

BACKGROUND

Pneumatic tube systems (PTS) are a well-known means for the automated transport of materials between, for example, an origination location and any one of a plurality of destination locations. A typical PTS includes a number of pneumatic tubes interconnected in a network to transport carriers between user stations. Various air sources/blowers and transfer units provide the force and path control means, respectively, for moving the carriers through and from tube-to-tube within the system. Generally, transfer units move or divert pneumatic carries from a first pneumatic tube to a second pneumatic tube in order to route the pneumatic carrier between locations, such as stations, in the PTS.

The pneumatic tubes that form a network of pathways may be arranged in any manner. Many systems include a number of individual stations that are interconnected to the network by a single pneumatic tube. The single pneumatic tube transfers carriers to and from the station under pressure and vacuum and is connected to a transfer device. Such transfer devices allow for redirecting pneumatic carriers to one or more additional pneumatic tubes. In this regard, carries may be routed between different stations. It will be appreciated that the number of stations and distances between stations in the network may be quite large. For instance, many large facilities (e.g., hospitals) incorporate pneumatic tube systems having dozens or even hundreds of user stations where the distance between the most distally located pair of stations may exceed several hundred yards or even several miles.

Large PTSs often require a complex network of interconnected tubes. Further, to provide functionality to separate portions of such large systems, most such systems are divided into multiple zones. Typically, each zone includes a set of stations that receive pneumatic pressure and/or vacuum from a common air source. For instance, a transfer device that receives pressure and/or vacuum from the common air source may connect to each station of such a zone. This transfer device permits carriers received from pneumatic tubes connected to each station to be transferred to another pneumatic tube associated with one of the other stations (e.g., intra-zone transfer) and/or transferred to a different zone (e.g., inter-zone transfer).

During a transaction, a pneumatic carrier is placed in a first station and a destination (e.g., second station) is provided for the carrier. A pneumatic tube connected to the station is then fluidly connected to the air source by aligning various transfer devices to connect pneumatic tubes between the air source and the station. At this time, the air source typically applies a vacuum to the pneumatic tube, which moves the carrier out of the station and into the pneumatic tube system. The carrier proceeds under vacuum until it reaches a turn-around location where the carrier is stopped. Various transfer devices are then realigned to connect pneumatic tubes, which provide a pneumatic path toward the ultimate destination of the pneumatic carrier. At this time, the air source typically provides positive air pressure to propel the pneumatic carrier from the turn-around location towards its ultimate destination through the realigned transfer devices and connected pneumatic tubes. If the ultimate destination is in the current zone (i.e., an intra-zone transfer) the carrier proceeds to its ultimate destination. If the ultimate destination is in a different zone (i.e., inter-zone transfer) the carrier proceeds to an adjacent zone for further processing. The routing of the carrier through a complex PTS typically requires initiating and stopping movement of the carrier at multiple locations.

SUMMARY

Provided herein are systems, apparatuses and methods for use in a pneumatic tube system (PTS). In one aspect of the presented inventions, pneumatic tube braking devices are disclosed. The braking devices are adapted for in-line incorporation with first and second pneumatic tubes and are operative to stop a pneumatic carrier passing through the pneumatic tubes. The in-line braking devices allow for decelerating a carrier to a stop over a distance to reduce the forces applied to the carrier and its contents. In one arrangement, the in-line braking devices create a closed chamber whereby the moving carrier creates a positive pressure ahead of itself with a "bicycle pump" effect. Compression of air ahead of the carrier provides a cushion that slows the carrier. In such an arrangement, one or more slide gates is provided that closes an interior bore of the braking device to create a closed chamber in front of the carrier. Various valves may also be provided to divert air behind the carrier and/or around the carrier once the carrier comes to a stop. In another arrangement, the in-line braking devices use a movable catch that extends into the path of a carrier (e.g., into a bore of a braking tube) and moves after contact by a carrier passing through the bore of the braking device to controllable stop the carrier. In one arrangement, the movable catch is connected to an electrical resistance element (e.g., motor) that allows for, among other things, determining carrier attributes and controlling a deceleration profile of the carrier. In further arrangements, movable catch embodiments are combined with compression/closed chamber embodiments. In any arrangement, these braking devices provide gradual braking or slowing of a carrier to reduce deceleration forces applied to the carrier and its contents. In other aspects of the presented inventions, the braking devices are incorporated into novel pneumatic tube system components and systems.

BRIEF DESCRIPTION OF THE DRAWINGS

For a more complete understanding of the present disclosure and further advantages thereof, reference is now made to the following detailed description taken in conjunction with the drawings in which:

FIG. 11 illustrates an exploded view of the braking device of FIGS. 10A, 10B and 10C.

FIG. 12 illustrates an exploded view of an exemplary gate assembly that may be utilized with the braking devices.

FIGS. 26A and 26B illustrate use of a braking device to form a by-pass assembly.

DETAILED DESCRIPTION

Reference will now be made to the accompanying drawings, which at least assist in illustrating the various pertinent features of the presented inventions. In this regard, the following description is presented for purposes of illustration and description. Furthermore, the description is not intended to limit the disclosed embodiments of the inventions to the forms disclosed herein. Consequently, variations and modifications commensurate with the following teachings, and skill and knowledge of the relevant art, are within the scope of the presented inventions.

Figure 1:
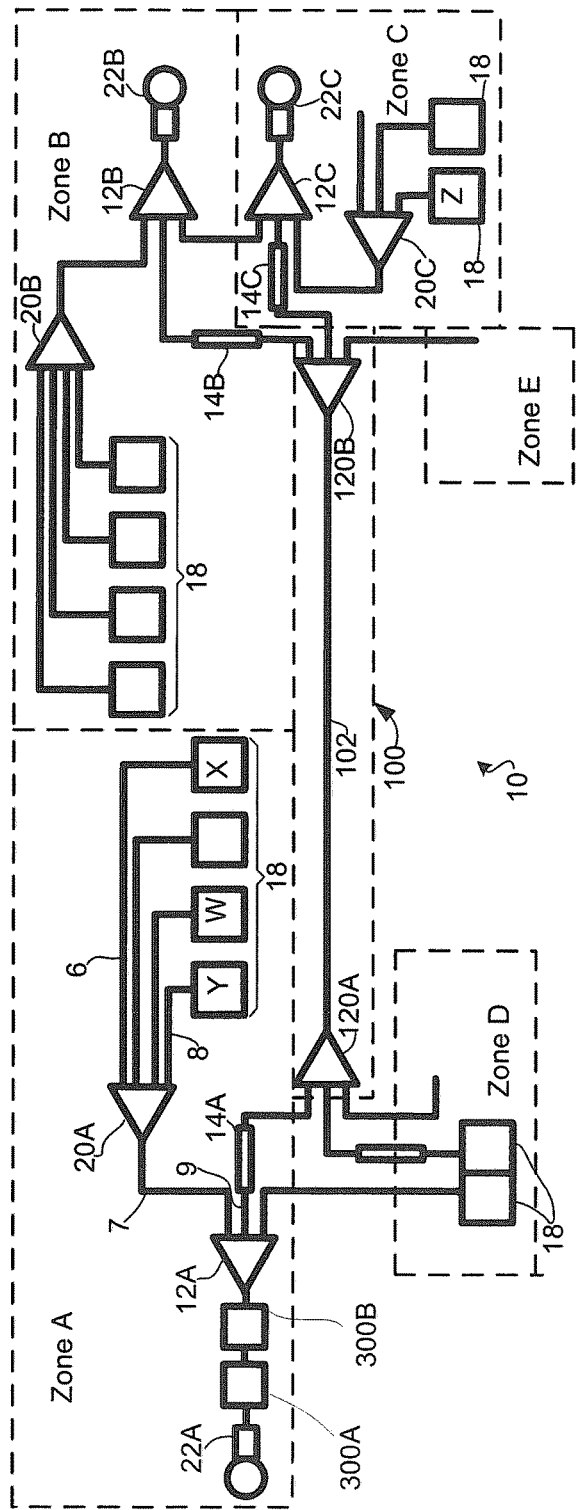
FIG. 1 illustrates one embodiment of a pneumatic tube system.

Disclosed in FIG. 1 is an exemplary system diagram for a pneumatic carrier system 10. The system is divided in to various zones each of which includes various components. For example, Zone A includes components 12A, 20A etc. Unless discussing a component of a specific zone (e.g., component 12A), the common components of each zone are generally referred to without the zone suffix (e.g., component 12 refers to component 12A, 12B etc.). In general, the pneumatic carrier system 10 transports pneumatic carriers between various user stations 18, each such transport operation being referred to herein as a "transaction". At each of the user stations 18, a user may insert a carrier, select/enter a destination address/identification and/or a transaction priority, and then send the carrier. The system determines a path to route the carrier and begins directing the carrier through the system.

Interconnected with most stations 18 is a pass-through transfer unit 20 which orders carriers arriving through different tubes from different stations 18 into a single pneumatic tube or diverts carriers a carrier arriving through the single tube into one of the different tubes connected to the stations. The pass-through transfer unit is connected by the single tube to a vacuum turn-around transfer unit 12 and a blower 22 that provides the driving pneumatic force for carrier movement. The turn-around transfer unit 12 receives a carrier trough one of multiple pneumatic tubes, holds the carrier therein and redirects the carrier back out one of the multiple tubes once realigned, as is more fully discussed below. A set of transfer units 12, 20, a blower 22 and one or more stations 18 typically define a single zone (e.g., zones A, B and C). In the present embodiment, the turn-around transfer unit 12 is a point of connection to each zone. However this is not a requirement.

Within the system 10 itself, one or more devices are employable for ordering and routing carriers to their selected destinations. One type of device is a traffic control unit (TCU) 14 which is employable to receive, temporarily store and controllably release one or more carriers. Such functionality allows, for example, holding a carrier until a path through a subsequent potion of the system becomes available. Often, a carrier is temporarily parked in a TCU under power of a first blower to await the availability of a downstream path. This frees the first blower to perform additional transactions while the carrier is parked and/or allows a blower of an adjacent zone to take over processing of the carrier transaction. Typically the TCUs 14 operate as linear storage devices, e.g., on a first in first out (FIFO) basis.

Figure 2:
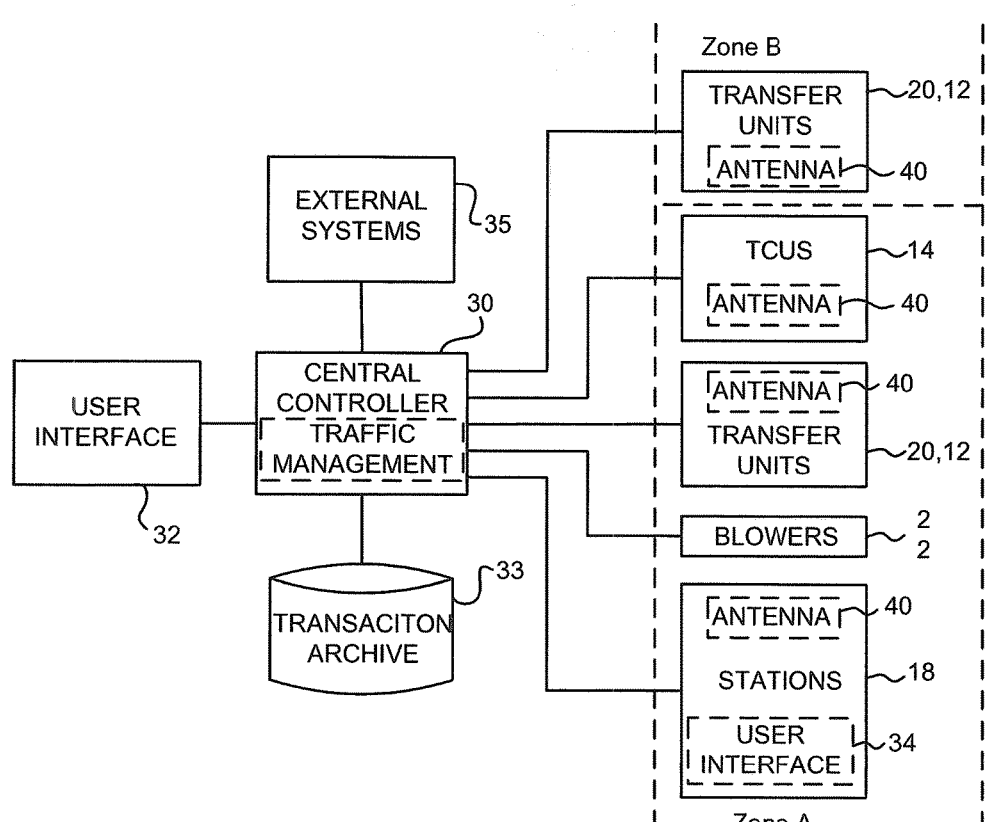
FIG. 2 illustrates a control system for use in controlling a pneumatic tube system.

All of the components described in FIG. 1 electronically connect to a central controller which controls their operation. Disclosed in FIG. 2 is an electrical system diagram for the pneumatic carrier system 10 described herein. Providing centralized control for the entire pneumatic carrier system 10 is a system central controller (SCC) 30. The SCC 30 may include a digital processor and memory. SCC 30 may be configured as one or more programmable digital computers. Connectable to the SCC 30 may be one or more user interfaces 32, 34 through which a system user may monitor the operations of the system and/or manually enter one or more commands to control its operation. Typically, at least one user interface 34 is located at or within an area serviced by stations 18. For example, in a medical facility application, one or more user stations 18 and at least one user interface 34 may be provided within each emergency room, laboratory, nursing station, etc. In this regard, the user interface may be contained in the stations 18, or be stand-alone units.

Each of the components described above in relation to FIG. 1 may include one or more electrical and/or electro-mechanical components which provide for the physical movement of a carrier within the system 10 and/or the obtainment/provision of information relating to the location of the carriers within the system 10. In this regard, the components shown in FIG. 2 are representations of the various electrical and electro-mechanical systems that may be employed by the pneumatic carrier system 10. Although in FIG. 2 they are represented single blocks, one skilled in the art will realize that the block for each type of device represents the electronics for a number of the same or similar type of components positioned throughout the system which provides for its operation. In various embodiments, each of the user stations 18, TCUs 14, transfer devices 20, 12 and/or pneumatic tubes may incorporate antenna devices/readers 40 configured to read or energize and retrieve identification information from identification devices such as bar codes, ID chips, etc. that may be incorporated into each of the carriers. Such a system is set forth in co-assigned U.S. Pat. No. 7,243,002, the contents of which are incorporated herein by reference.

Referring again to the electrical system diagram of FIG. 2, it may be seen that various transfer units 12, 20, and blowers 22 are also electrically connectable to the SCC 30. Through these connections, SCC 30 may send command signals to these devices so that they are actuated and operating at particular times and in particular sequences to affect the completion of the various carrier transactions. Other signals exchanged may include various monitoring signals that indicate the devices are operating as desired.

The SCC 30 is further connectable to a transaction archive 33, or database, which is configured to store transaction information for carriers moving within the system 10. The transaction information may include identification information for carriers moving through the system and destination information entered by a system user. Further, the transaction information may include sender identification, recipient identification, security information (e.g., PIN numbers) and/or location information obtained via tracking inputs received from antenna devices/readers 40 located at user stations 16, 18, TCUs 14, pneumatic tubes or other components along the travel path of a given carrier. The external systems 35 connected may depend on the purpose of the pneumatic carrier system 10. For example, the external systems 35 may include a lab information system, a pharmacy information system, a patient information system, a security information system and/or messaging systems (e.g., email, text, paging, or wireless system, etc.).

Figure 3:
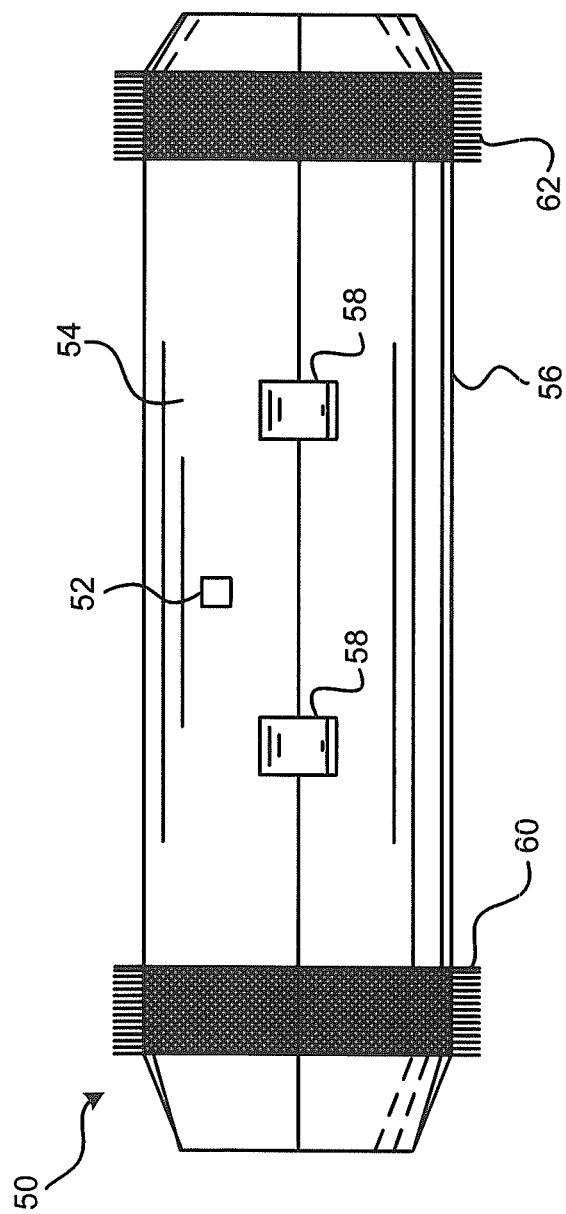
FIG. 3 illustrates one embodiment of carrier for use in a pneumatic tube system.

One type of carrier 50 that may be utilized with the system 10 is illustrated in FIG. 3 and includes first and second shell members 54 and 56 that collectively define an enclosed space for use in carrying materials as they are transported through the system 10. These shell members 54, 56 are adjoinably cylindrical in cross-section for use in correspondingly cylindrical pneumatic tubes of the system 10. The shell members 54 and 56 may be pivotably interconnected by a hinge member (not shown), and latches 58 may be provided for securing the first shell member to the second shell member in a closed configuration. Also included as part of the carrier 50 are wear bands 60, 62. The wear bands 60, 62 are sized to snuggly fit within the inside surface of the pneumatic tubes in order to substantially block the passage of air across a carrier 50 within such a pneumatic tube. Accordingly, this blockage results in a pressure differential across the carrier 50 that results in the carrier 50 being pushed or drawn through the pneumatic tube. In the illustrated embodiment, an ID chip 52 (e.g., RFID, bar code, etc.) is attached to one of the shell members 54. In this regard, antenna device/readers may be incorporated into system components and/or pneumatic tubes within the system 10 to monitor the location and/or translocation of the carrier through the system. In a further embodiment, an ID chip or element may be attached to an item (e.g., payload) disposed within the interior of the carrier 50. In such an arrangement, the carrier itself may or may not include such an ID chip. What is important is that the carrier or its contents may be identified as they pass through the system. Accordingly, transaction information (e.g., destination information) associated with the identification read from the carrier or its contents may be cross-referenced at multiple locations throughout the system. Such cross-referencing may prevent the misdirection or erroneous delivery of a carrier transaction.

System Operation

Referring again to FIG. 1, and Zone A, an exemplary intra-zone transfer between station 18X and stations 18Y is described. Initially, a user inserts a carrier into station 18X and requests transfer to station 18Y. The system controller operates the blower 22A of Zone A to provide vacuum to station 18X. This requires aligning the internal tubing of the turn-around transfer unit 12A and the transfer unit 20A to the pneumatic tube 6 connecting station 18x to the transfer unit 20A. Once aligned, the blower provides vacuum and the carrier is drawn into the pneumatic tube 6. The carrier passes through the pass-through transfer unit 20A and is received in the turn-around transfer unit 12A, which stops and holds the carrier during realignment. That is, the system controller aligns the internal tubing of the pass-through transfer unit 20A with a pneumatic tube 8 interconnected to station 18Y. The blower 20A then provides pressure to the carrier expelling the carrier out of the turn-around transfer unit 12 through the pass-through transfer unit 20A, into tube 8 and to station 18Y.

An exemplary inter-zone transfer is discussed in relation to movement of a carrier from station 18X in Zone A to station 18Z in Zone C. Again, to provide vacuum to station 18X, the system controller aligns the internal tubing of the turn-around transfer unit 12 and pass-through transfer unit 20A to provide a continuous pneumatic path between station 18X and the turn-around transfer unit 12A. Accordingly, the vacuum may be applied to these aligned tubes to draw a carrier from station 18X into the turn-around transfer unit 12A. At this time, internal tubing of turn-around transfer unit 12A may be aligned with the output tube 9. Once aligned, blower 22 provides positive pressure behind the carrier, which displaces the carrier from the turn-around transfer unit 12A and into tube 9. The carrier is received by TCU 14A where it awaits delivery into the inter-zone transfer unit 100 which interconnects different zone of the pneumatic tube system. Alternatively, the carrier may pass directly through the TCU 14A if all downstream components are aligned. As shown, an inter-zone transfer unit 100 connects Zone A and Zone C. The inter-zone transfer unit 100 utilizes opposing pass-through transfer units 120A, 120B having head ends (e.g., single port inlets) connected by a single connecting tube 102, which may be of considerable length. The single connecting tube may include various bends and/or elevation changes (not shown). The output ends of the opposing pass-through transfer units 120A, 120B are each selectively connectable to multiple tubes that may be connected to different zones and/or stations. Other embodiments may use dedicated one-way transfer tubes between different zones as disclosed by co-owned U.S. Pat. No. 7,243,002 as incorporated above.

The carrier exits the TCU 14A and is directed through the interzone transfer unit 100 under positive pressure provided by the blower 22A of zone A and proceeds until it is received by a TCU 14C in Zone C. At this time, the blower 22A of Zone A has completed its part of the transaction and may be utilized to perform other pending transactions for Zone A. The blower 22C of Zone C provides vacuum to the carrier disposed in the TCU 14C to move the carrier into the turn-around transfer unit 12C. The turn-around transfer unit 12C is then realigned to provide the carrier to transfer unit 20C, which is aligned with desired station 18Z. Accordingly, the blower 22C may provide positive pressure to move the carrier out of the turn-around transfer 12C, through the transfer unit 20C and to station 18Z.

Pneumatic Tube Brake

One problem particular to conventional pneumatic tube systems is the impact forces applied to a carrier and its contents when stopping a carrier at various locations throughout the system. Conventional systems often bring a moving carrier to rest by inserting a finger or dog (e.g., 'catch') into the direction of carrier travel. The carrier collides with the stationary catch bringing the carrier to an abrupt halt. Inserting a stationary catch into the path of a carrier can cause significant deceleration forces, which can exceed 30-50 g's, potentially harming the carrier, the payload and requiring the supporting equipment to be large to survive repeated impacts and jerks. In the in-line braking devices presented herein, the velocity of a carrier is decreased over a distance to reduce the forces applied to the carrier and its contents. In one embodiment, the in-line braking device creates a closed chamber whereby the moving carrier creates a positive pressure ahead of itself with a "bicycle pump" effect. Compression of air ahead of the carrier provides a cushion that slows the carrier. In another embodiment, the in-line braking device uses a catch that extends into the path of a carrier (e.g., into a bore of a pneumatic tube) to stop the carrier. Unlike prior catch mechanisms, the catch is operative to move when contacted by the carrier. This movement reduces the force applied to the carrier and allows for controllably stopping the carrier over a distance. In a further embodiment, the in-line braking device uses a combination of a closed chamber and a movable catch to decelerate a carrier over a distance. In any embodiment, these mechanisms allow a gradual braking or slowing of the carrier reducing the deceleration forces applied to the carrier and its contents. This allows the deceleration profile to be shaped and manipulated. This is a valuable feature that, in various embodiments, enables the braking devices to dynamically adapt their braking characteristics in response to carrier weight, payload sensitivity, or any combination thereof.

The following description and figures describe four separate embodiments of carrier braking devices. These four embodiment are generally directed to: 1) an electric energy absorber approach; 2) an air pressure energy absorber approach; 3) a hybrid electric and air energy absorber approach; and 4) a hybrid passive contactor (friction) and air energy absorber approach. In any of the embodiments, the braking devices may be interconnected in-line between first and second pneumatic tubes within the system 10. In such an arrangement, an internal bore of the pneumatic tube brake is aligned with the internal bores of the first and second pneumatic tubes through which the pneumatic carrier 50 may be transported. Each of the devices either includes a controller or is connectable to a pneumatic tube system controller to effect operation of valves and/or slide gates of the various devices. In any embodiment, the braking devices are operative to arrest the movement of a pneumatic carrier as it passes through a tube of the pneumatic system. More importantly, the braking devices are operative to fully arrest the movement of a carrier over a distance reducing impact forces applied to the carrier.

Electric Energy Absorber Approach

Figure 4:
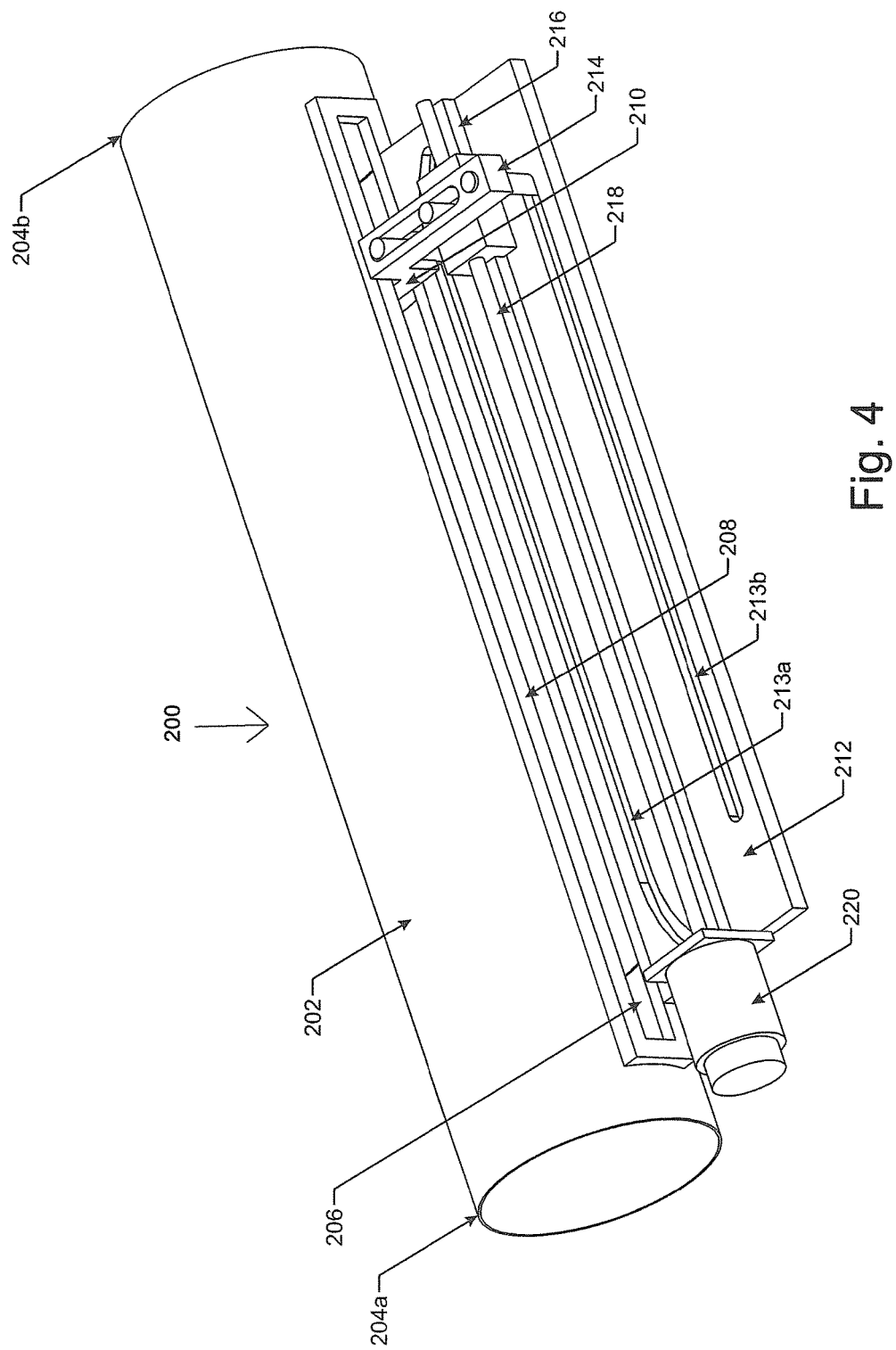
FIG. 4 illustrates a perspective view of one embodiment of a braking device.
Figure 5:
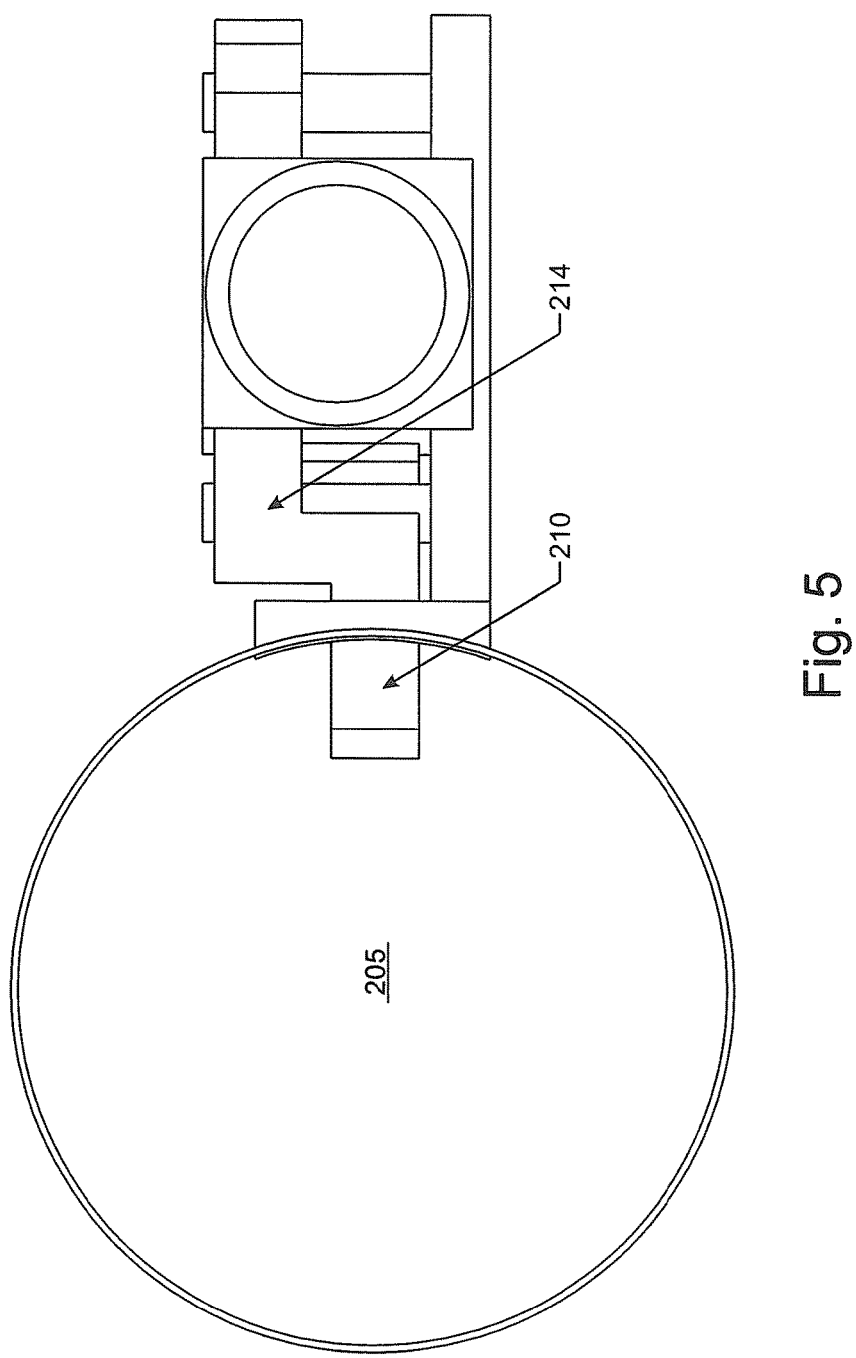
FIG. 5 illustrates an end view of the braking device of FIG. 4.

FIG. 4 illustrates a perspective view of an electric energy absorbing braking device 200. As shown, the braking device 200 include a pneumatic or brake tube 202 with an internal bore extending between a first open end 204a and a second open end 204b that may be interconnected between or "in-line" with first or second pneumatic tubes of the pneumatic tube system. When so connected, a carrier passing though the pneumatic tube system may pass into and/or through the braking device 200. The carrier may pass though the device 200 unimpeded or the braking device may bring the carrier to a controlled stop. As shown, the brake tube 202 includes an elongated slot 206 extending along a portion the length of the tube 202. Generally, the slot 206 allows a movable catch mechanism 210 to extend into the internal bore 205 of the brake tube 202 and, upon being contacted by an incoming carrier, move along the length of the slot 206 to decelerate and stop the carrier. More specifically, the catch mechanism engages a carrier while the catch mechanism 210 is located near a first end of the slot and brings the carrier to a stop over a distance to reduce impact forces applied to the carrier and its contents. As shown in FIGS. 4 and 5, the catch 210 extends into the internal bore 205 of the tube 202 and moves along an external guide track 212 from a first position to a second position along the length of the slot 206. In the illustrated embodiment, the track 212 attaches to a mounting block 208 connected to an outside surface of the brake tube 202.

Figure 6:
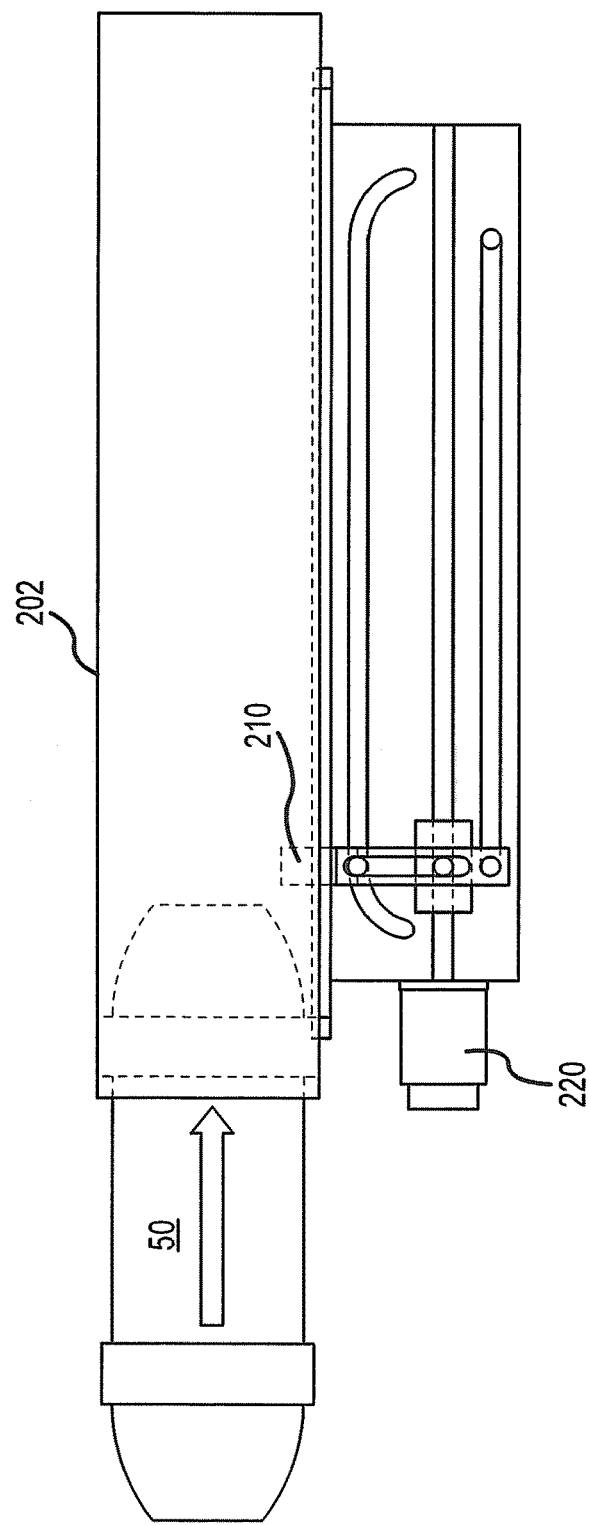
FIGS. 6, 7, 8 and 9 illustrate the operation of the braking device of FIG. 4.
Figure 7:
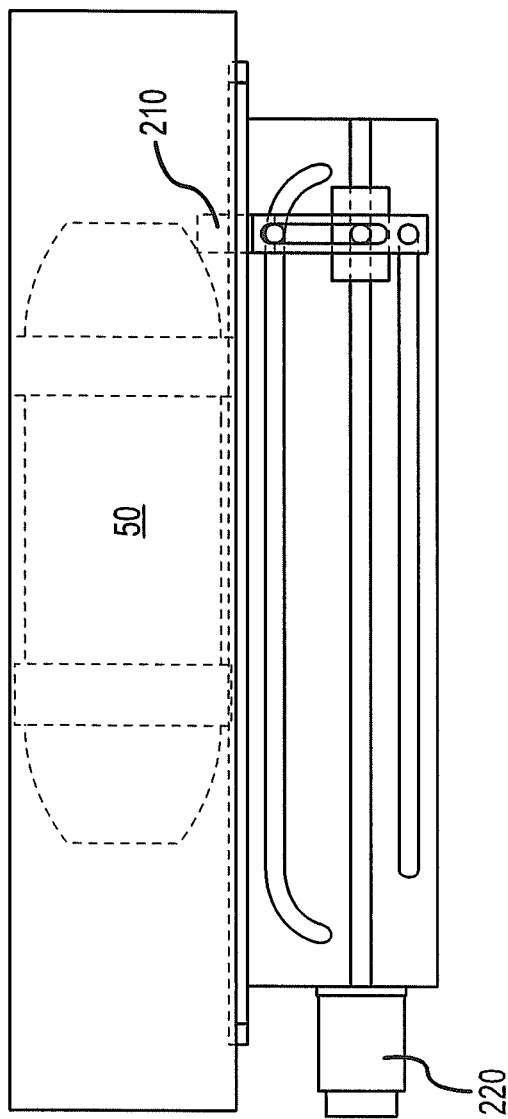

FIGS. 6 and 7 further illustrate use of the brake device 200 to controllably decelerate and stop a moving carrier. As shown in FIG. 6, as a carrier 50 initially enters into the braking device 200 a forward end of the carrier 50 contacts the catch 210 extending into the internal bore 205 of the brake tube 202. At this time, the catch 210 is positioned on the track 212 near the entry end of the device 200. Typically, the catch 210 includes a urethane or other resilient contact pad to reduce impact with the carrier. After the carrier contacts the catch 210, the catch 210 moves in parallel with the carrier 50 decelerating the momentum of the carrier. More specifically, the catch 210 is interconnected to a connecting lever 214 that extends through the slot 206 and connects to the guide track 212. See also FIG. 4. In the illustrated embodiment, the lever 214 attaches to a linear slide block 216 that receives a threaded ball screw 218. The threaded ball screw 218 passes through a threaded interior of the linear slide block 216 and is connected to a servo motor 220. Accordingly, as the carrier moves through the brake tube 202, the catch 210 is displaced and the linear slide block 216 rotates the ball screw 218, which turns the servo motor 220. This provides a resistance to movement of the carrier as it passed through the braking device 200. More specifically, kinetic energy of the carrier is converted to electrical energy, which may be stored in an electrical storage device or dumped into an external resistor.

Figure 8:
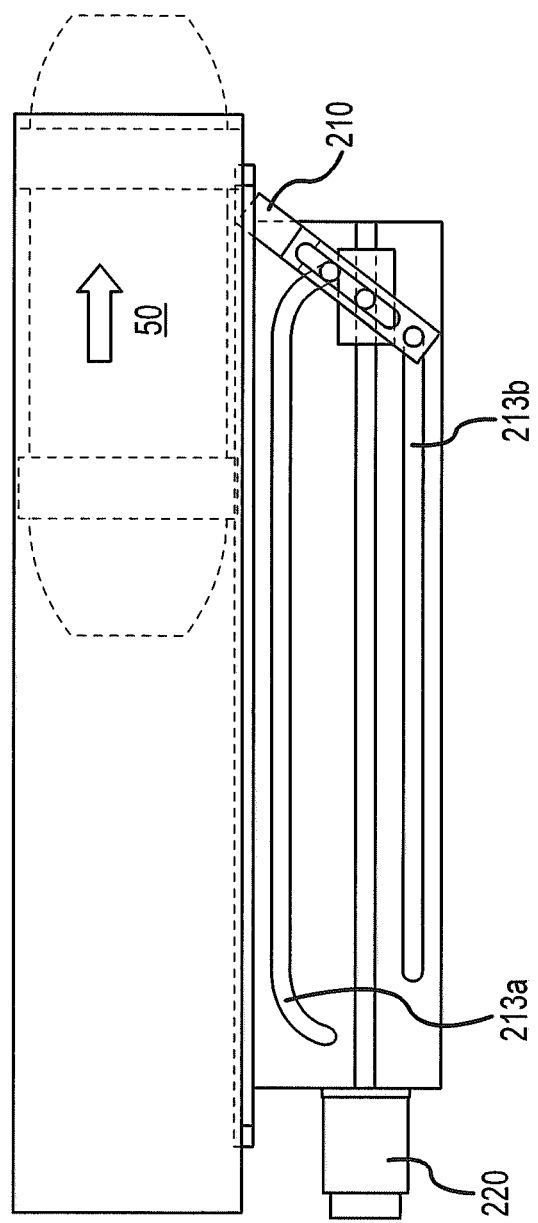

The track 212, which supports the catch and linear slide block, includes an inner track 213a and an outer track 213b. Pins connected to the lever 214 of the catch 210 ride in these tracks during movement of the catch 210. Of further note, the inner track has curved portions on either end. As illustrated in FIG. 8, this allows the catch lever 214 to rotate at the ends of its movement. The rotational movement of the lever allows for releasing the carrier 50. That is, after a carrier is stopped, it is necessary to remove the catch from the internal bore to reinitiate movement of the carrier. To prevent air loss from the braking device 200, the entire device may be disposed within a pressure jacket (not shown). Of further note, the device 200 is reversible. That is, the catch 210 may be positioned toward either end of the track 212 to allow for catching a carrier passing in either direction.

Figure 9:
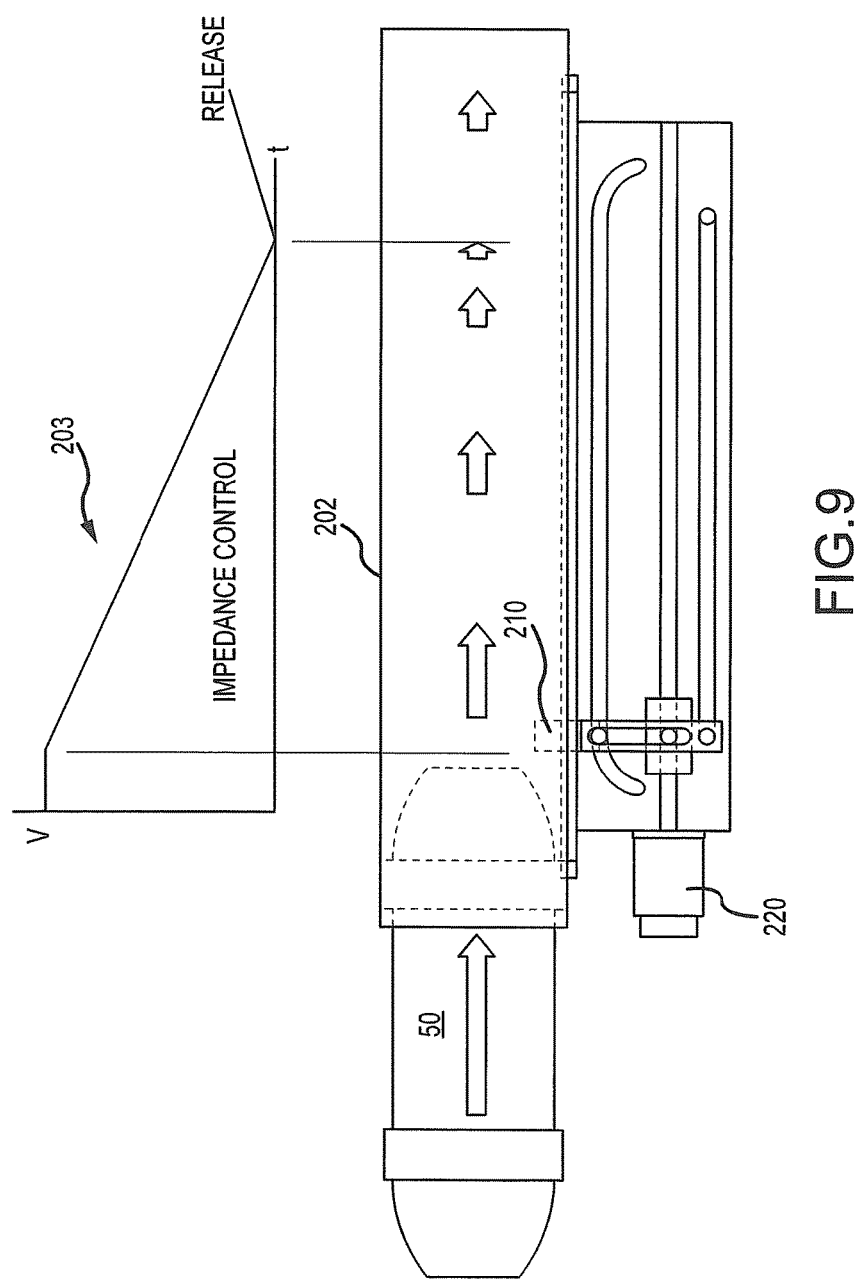

As shown in FIG. 9, the deceleration profile 203 of the carrier can be monitored and controlled. Specifically, various attributes can be calculated for an incoming carrier and these attributes can be used to tailor the deceleration profile of the carrier. As will be appreciated, the force of an incoming carrier is equal to its mass times acceleration. Therefore, the mass of the carrier is the force of the incoming carrier divided by its acceleration. Further, acceleration is a change in velocity over a change in time. These changes (i.e., velocity and time) can be measured once the carrier contacts the catch. Along these lines, a total force may be calculated and used for intelligent control. That is, upon determining the velocity over time, a deceleration and force can be calculated for the carrier. Accordingly, the impedance of the servo motor 220 may be adjusted to provide a desired resistance and a desired deceleration profile 203. Though the illustrated deceleration profile is shown having a constant deceleration over the entire length of the track, it will be appreciated that different profiles may be utilized. Stated otherwise, a deceleration profile may be tailored to an incoming carrier based on velocity, mass etc. In other embodiments, the power or voltage measured at the motor 220 upon contact may be utilized to select a deceleration profile.

Air Pressure Energy Absorber Approach

Figure 10A:
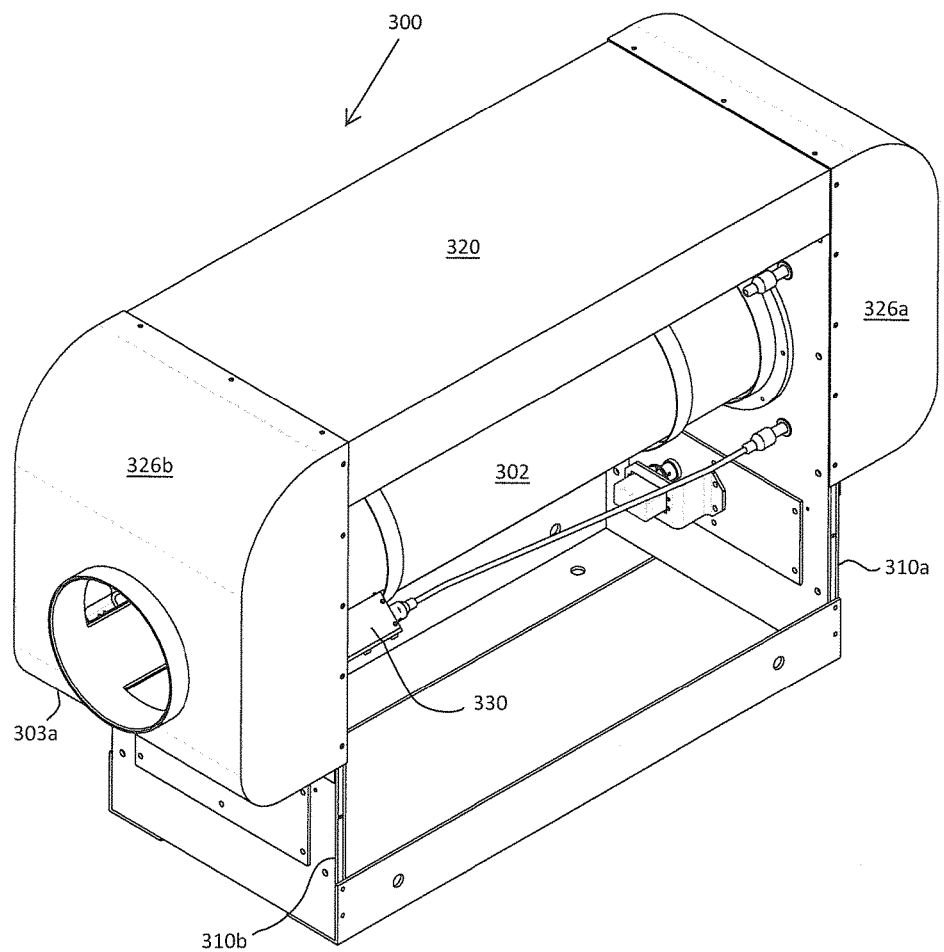
FIGS. 10A, 10B and 10C illustrate another embodiment of a braking device.
Figure 10B:
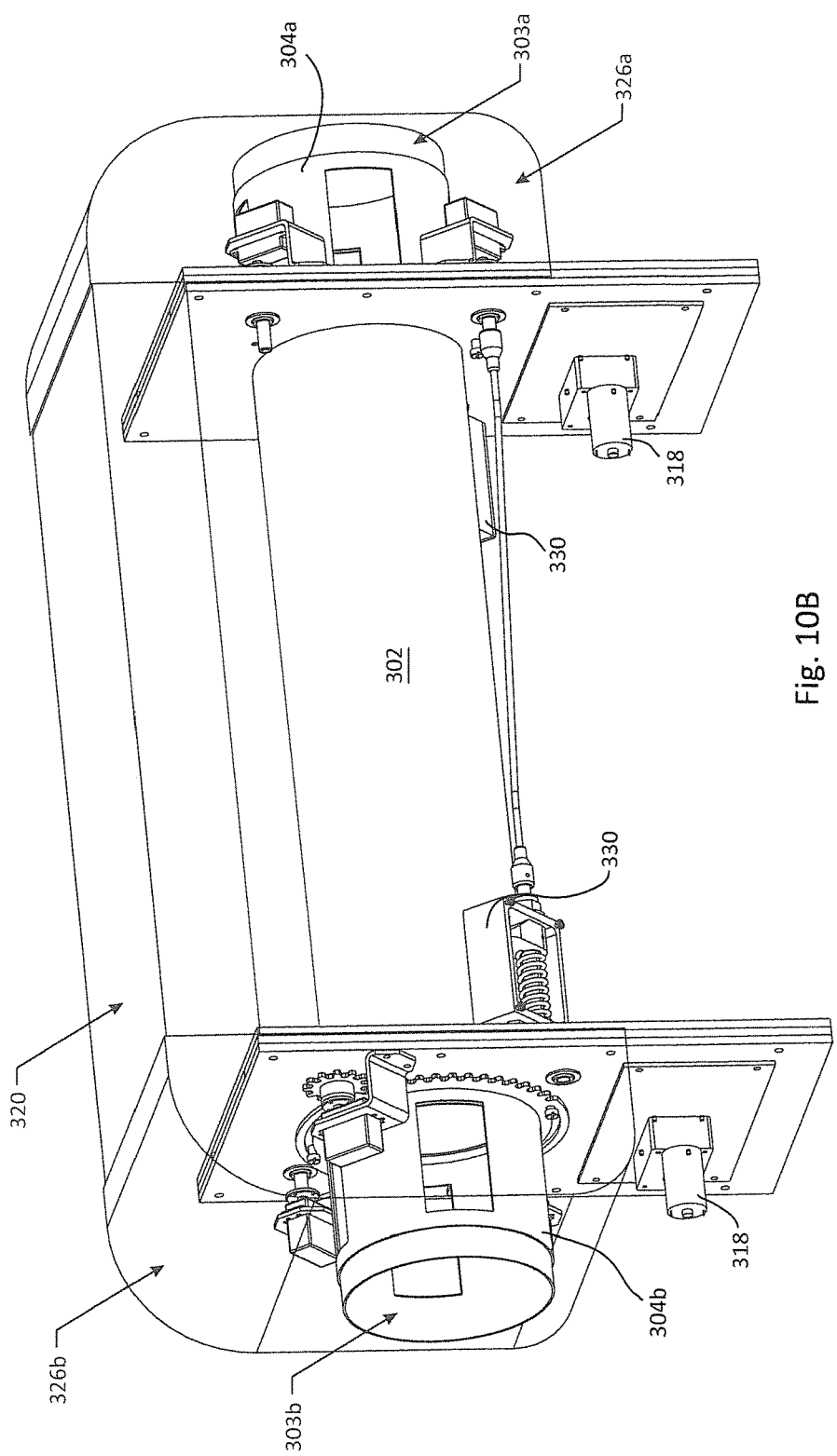
Figure 10C:
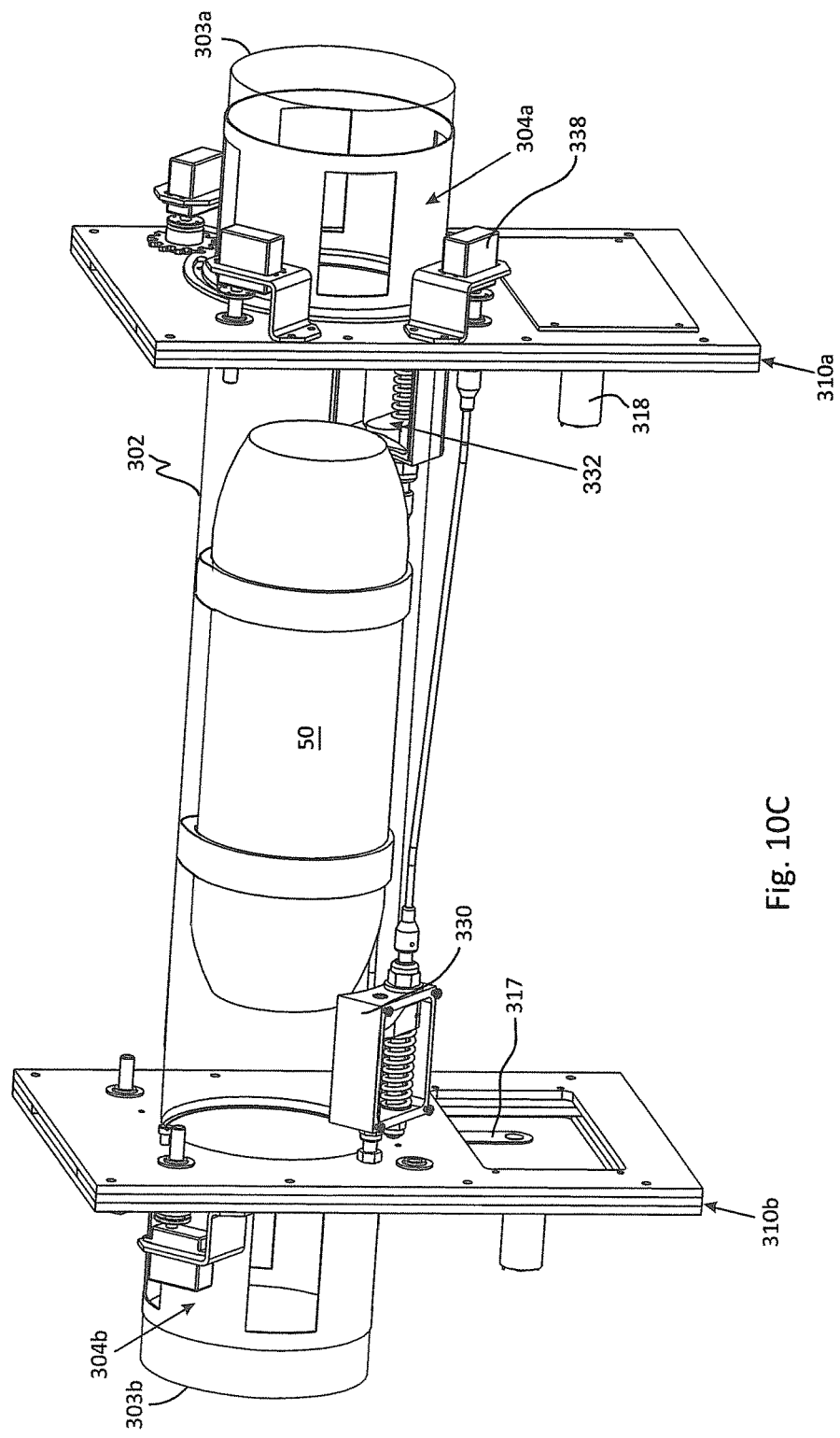

FIGS. 10A-10C illustrate various views of another embodiment of an in-line braking device 300. Specifically, FIG. 10A shows a perspective view of the device 300, FIG. 10B shows a perspective view of the device 300 with a number of components in phantom for illustration purposes, and FIG. 10 C illustrates further perspective view of the device 300 with additional components removed and/or in phantom for purposes of illustration. This embodiment of braking device 300 primarily utilizes air pressure to stop an incoming carrier. As shown in FIGS. 10A-10C, the device 300 includes a pneumatic or braking tube 302 having an internal bore 305 sized to receive a carrier 50 between first and second open ends 303a and 303b. As above, the open ends allow the device 300 to be connected in-line with first and second pneumatic tubes of a pneumatic tube system.

The device 300 includes first and second slide gate assemblies 310a, 310b (hereafter 310 unless specifically referenced) and first and second rotary valves 304a, 304b. The slide gate assemblies 310 permit the insertion of a plate or gate into the bore of the brake tube 302 to prevent airflow through the tube. By closing one of the slide gate assemblies (e.g., 310a; See FIG. 10c), an air cushion can be created in front of an incoming carrier 50. That is, closing the slide gate assembly 310 creates a closed chamber and the incoming carrier compresses the air in the closed chamber with a "bicycle pump" effect. The compression of air ahead of the carrier provides a cushion that slows the carrier. The slide gates 310 are disposed towards opposing ends of the brake tube 302 and have a spacing that is at least sufficient to position a carrier 50 within the internal bore of the braking tube between the slide gates 310. See FIG. 10C.

Disposed outward of each of the slide gates 310a, 310b are the rotary valves 304a, 304b, which allow for diverting air from within the braking tube 302 to atmosphere and/or into a bypass duct 320 and back into the braking tube. In the latter embodiment, additional shrouding or housings 326a, 326b surround the rotary valves 304a and 304b and connect to the bypass duct 320. These housings maintain air within the system. When a carrier 50 is within the device 300 the rotary valves 304a, 304b can be opened to divert air around the stationary carrier, which substantially blocks the internal bore of the braking tube 302. Such diversion allows for continuing downstream operations in the pneumatic tube system while a carrier is disposed within the braking device 300. The rotary air valves 304a, 304b are substantially similar to those disclosed in co-owned U.S. Pat. No. 8,317, 432, which is incorporated herein by reference. Generally, each of the rotary valves includes an outer rotating sleeve 305 that passes over a perforated portion of the braking tube 302 having a number of apertures 307 through the sidewall. See FIG. 11. Each of these sleeves 305a, 305b include apertures which may be aligned or misaligned with the apertures 307 in the mating perforated portion to open and close the valve. Various actuators and/or gearing is provided to open and close the rotary valves. The rotary valves provide significant diversion area while allowing a carrier to pass through the valve. However, it will be appreciated that other venting mechanisms may be utilized and that the presented disclosure is not limited to the use of rotary valves.

FIG. 12 illustrates an exploded perspective view of the slide gate assembly 310. As shown, each slide gate assembly 310 include two plates 312a, 312b, which each include an aperture that is substantially the same size as the internal bore of the pneumatic tube 302. In this regard, a carrier 50 may pass through the apertures in the slide plates 312. First and second spacers 314a, 314b are disposed between the slide plates 312 when assembled. These spacers 314a, 314b provide a space between the plates that allows a gate 316 to slide from a first position out of alignment with the apertures in the slide plates 312 into a second position in alignment (not shown) with the apertures in the slide plates 312. This gate 316 is operated by a lever 317 that is connected to an actuator/motor 318. Rotating the actuator 318 causes the gate 316 to move into and out of alignment with the apertures. Stated otherwise, the gate 316 may be closed to create a partial or complete blockage within the braking tube 302.

Timing and control of the gates and valves may be performed by the system control and/or local embedded electronics. In addition, the device may further incorporate various sensors. Such sensors may include, without limitation, proximity sensors, pressure sensors and accelerometers. Outputs of any such sensors may be utilized to control the operation of the braking device.

Figure 13:
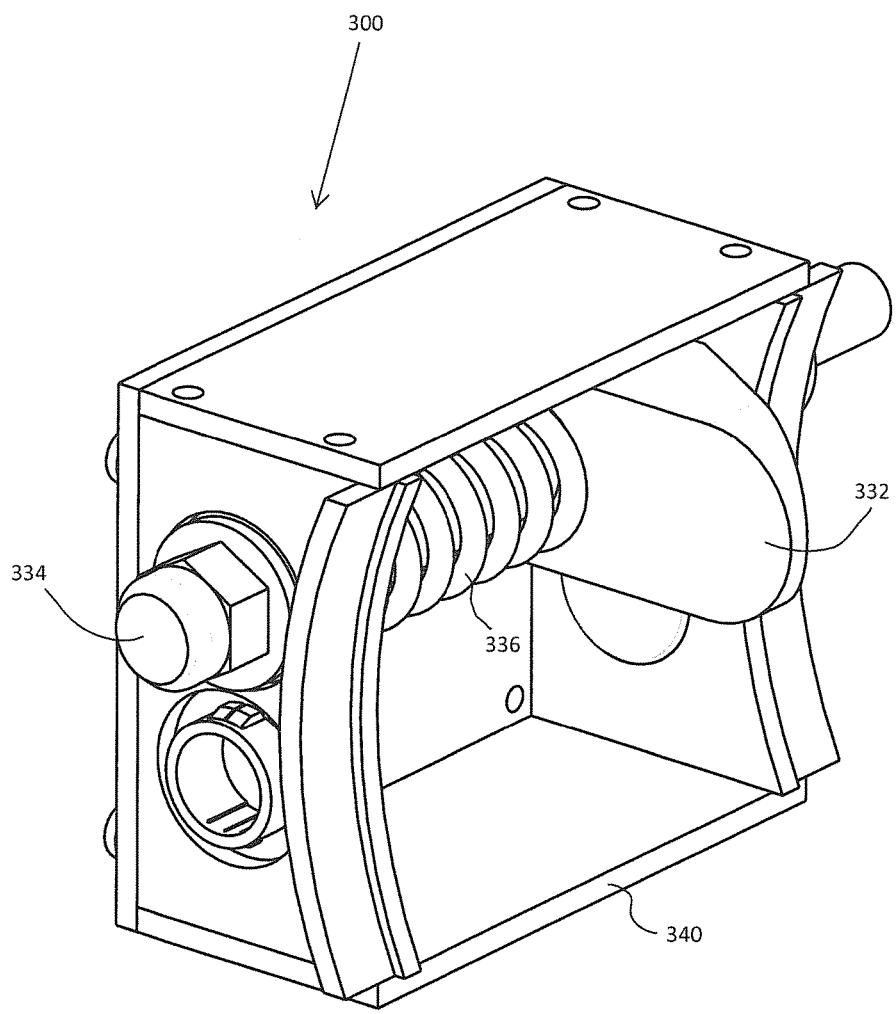
FIG. 13 illustrates a stop assembly that may be incorporated into the braking devices.

In some instances, use of an air cushion alone is insufficient to arrest the movement of a carrier 50 prior to the carrier contacting a closed slide gate. For instance, in the case of a carrier with worn slide rings, air compressed by the carrier may bypass across the carrier reducing the braking efficiency. Likewise, heavy carriers may have enough momentum to force compressed air in front of the carrier back across the carrier. In such instances it may be desirable to insert a mechanical stop 330 into the bore of the braking tube 302 to prevent a carrier from contacting a closed slide gate. In the illustrated embodiment of FIGS. 10A-10C, a deflectable stop 330 is provided that can be disposed into the internal bore of the braking tube 302 when needed. As best shown in FIGS. 10C, 11 and 13, two deflectable stops 300 are disposed at opposing ends of the braking tube between the slide gate assemblies 310.

The deflectable stop 330 includes a finger or pawl 332 mounted to an axel 334. The pawl is biased to one end of the axel by a spring 336. Accordingly, when the pawl 332 is disposed into the bore of the braking tube 302, the pawl 332 gives if contacted by the carrier. That is, when the carrier contacts the pawl 332 the spring 336 compresses, which further slows the carrier prior to complete compression of the spring. Once the spring is fully compressed, the pawl becomes a static member fully arresting carrier movement.

In the present embodiment, the deflectable stops 330 may be selectively disposed into the bore of the device 300. As best shown in FIGS. 10C and 11, the deflectable stop 330 is controlled by an actuator 338 connected to the stop 330 via an actuator rod or cable 337. The actuator 338 is operative to rotate the pawl such that it either rotates into the bore of the brake tube 302 or such that it rotates into the stop housing 340 and is removed from the brake tube. In one arrangement, the pawl closest to a closed slide gate may be moved into the bore of the brake tube 302 each time a carrier is incoming (i.e., each time the slide gate closes). In another arrangement, the opposing pawl may be moved into the bore once the carrier passes the pawl. In this latter arrangement, the opposing pawl may prevent compressed air in front of the carrier from ejecting the carrier back out of the braking device after the carrier comes to a stop. That is, the opposing pawl may prevent ejection of the carrier due to the compressed air in front of the carrier decompressing once the carrier is stopped.

Figure 14:
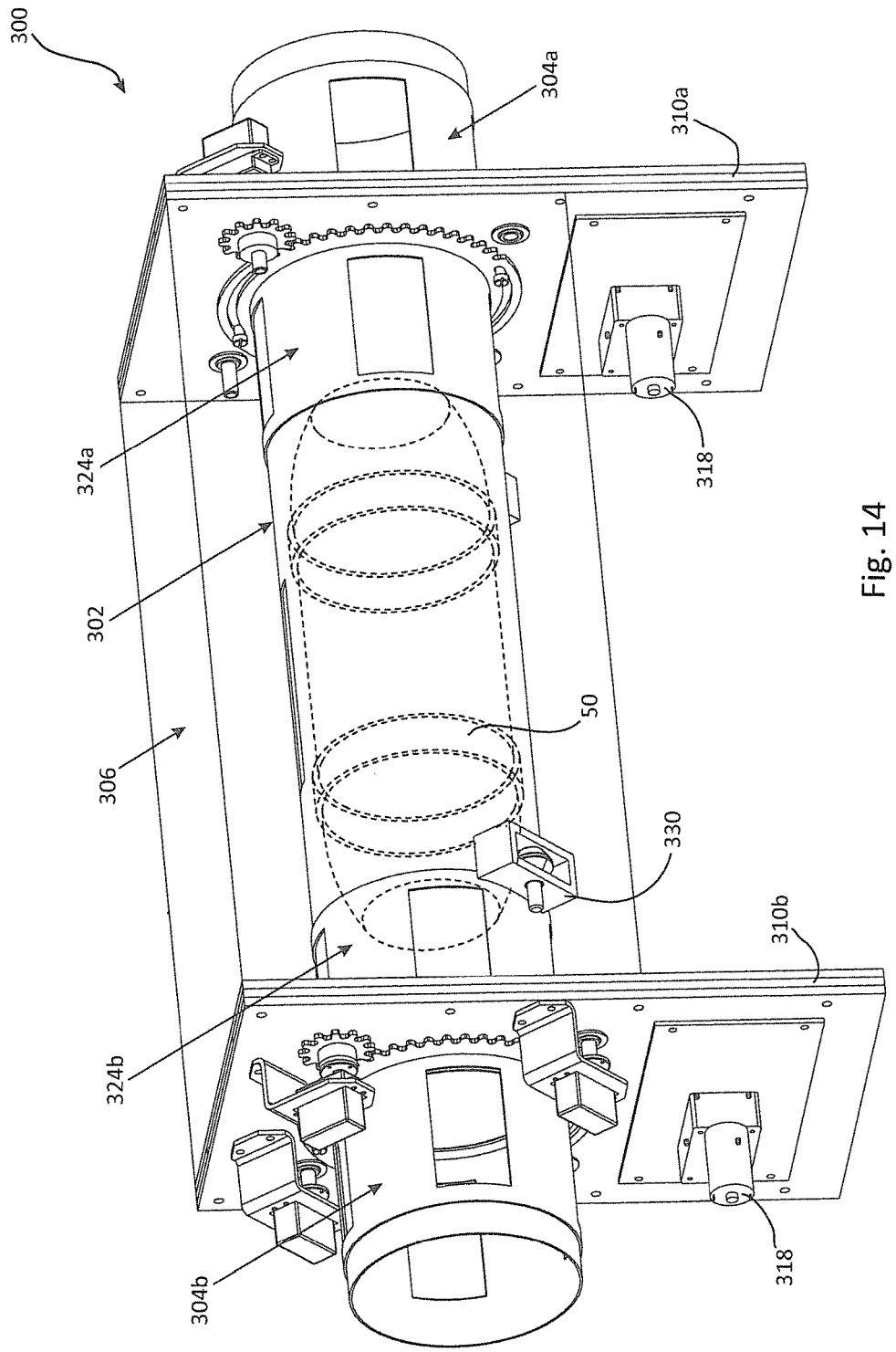
FIG. 14 illustrates another embodiment of a braking device.

FIG. 14 illustrates a further embodiment of the braking device similar to the embodiment of FIGS. 10A-10C. Though illustrated without a bypass duct, it will be appreciated that the device of FIG. 14 may also be utilized with a bypass duct. The device 300 of FIG. 14 is substantially similar to the previously discussed embodiment with one notable exception. This embodiment of the braking device 300 includes two additional rotary valves 324a, 324b disposed between the slide gate assemblies 310a, and 310b. These 'inner' rotary valves 324a, 324b allow for venting air from the brake tube 302 when one of the slide gates is closed. For instance, when slide gate 310a is closed, inner valve 324a may be opened to vent air in front of the carrier 50 to better control the braking of an incoming carrier. In a further embodiment, the inner valves 324 vent into a pressure jacket 306, which surrounds the inner valves and braking tube 302 between the slide gate assemblies. The pressure jacket is substantially sealed such that air displaced from the tube pressurizes within the pressure jacket 306. However, it will be appreciated that the pressure jacket 306 need not be entirely air tight. A pressure sensor may be disposed into the pressure jacket to monitor pressure changes caused by the incoming carrier. Accordingly, the monitored pressure changes may be utilized to determine one or more attributes regarding the incoming carrier. Likewise, this information may be used to tailor a declaration profile for the carrier. In this instance, tailoring a deceleration profile may entail adjusting the inner valve to adjust the air cushion in front of the incoming carrier.

Figure 15A:
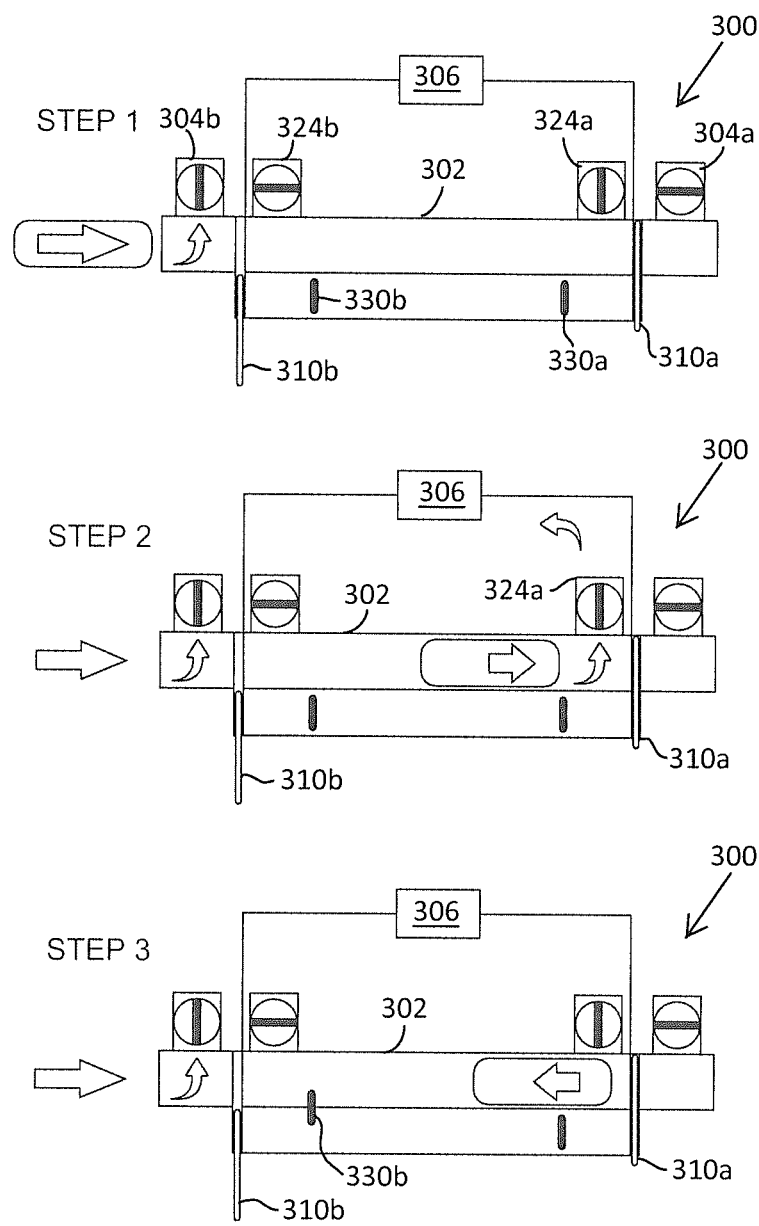
FIGS. 15A and 15B illustrate the operation of the braking device of FIG. 14.
Figure 15B:
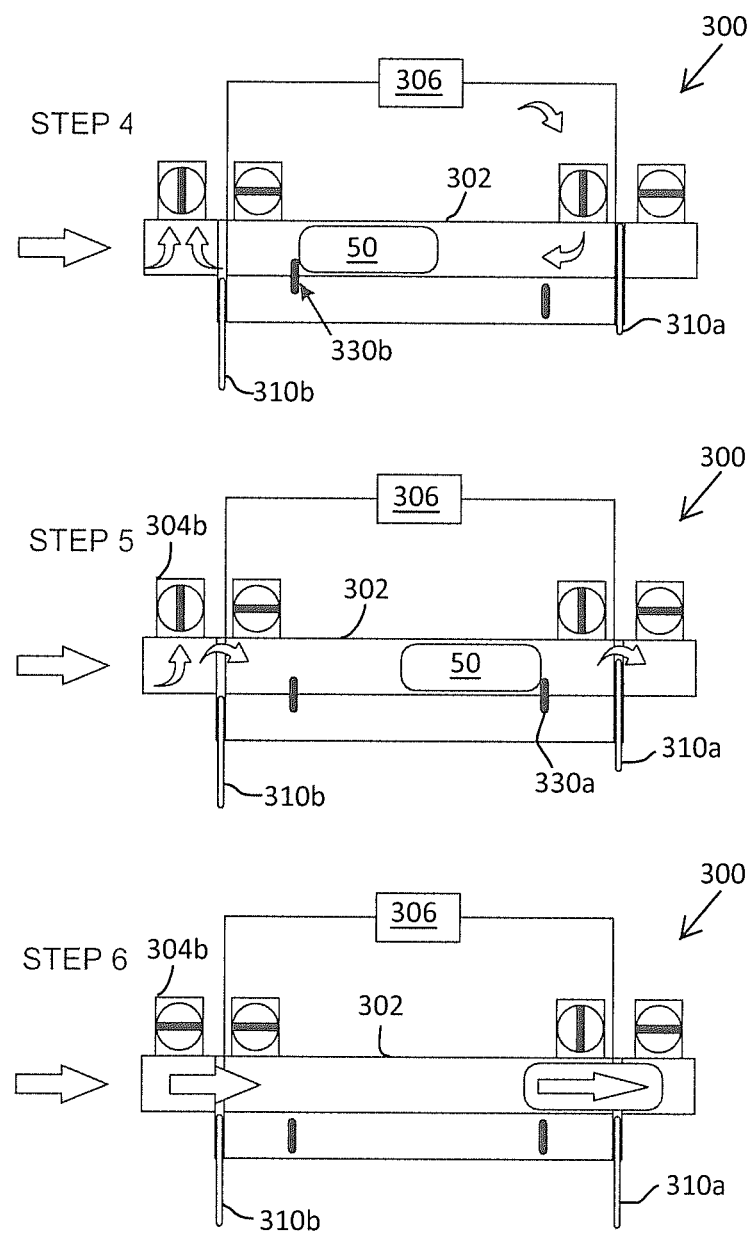

FIGS. 15A, 15B, 16A and 16B illustrate operation of the braking device of FIG. 14 without a bypass duct and with a bypass duct, respectively. Though discussed as utilizing a braking device that utilizes both inner and outer rotary valves, it will be appreciated that operation of the braking device of FIGS. 10A-10C (i.e., utilizing only the outer rotary valves) is similar and portions of the following discussion apply to this embedment as well. As discussed herein, the operation of these devices is illustrated and described with a carrier entering the braking device from the left and exiting to the right. However, it will be appreciated that the devices may be bi-directional and use of terms such as right and left are utilized by way of description and not by way of limitation. As shown in Step 1 of FIG. 15A, when the device 300 is set to receive an incoming carrier 50, the right gate 310a is closed while the left gate 310b is open to permit entry of the carrier into the device. See step 1. As further shown in Step 1 of FIG. 15A, when a carrier is inbound for the braking device 300, the right inner valve 324a is opened and the left outer valve 304b is likewise opened. The other valves are closed. As the carrier proceeds into the device 300, air in front of the carrier 50 passes through the open inner valve 324a into the pressure jacket 306. The increase in pressure provides an air cushion that slows the carrier 50. Additionally, the right stop 330a could be deployed. Further, as the left outer valve 304b behind the carrier is opened, most of the air force behind the carrier is bled to atmosphere after the carrier passes the outer valve. See Step 2. When the carrier reaches the right end of the device 300, (see Step 3) air within the pressure jacket 306 is pressurized and may begin to propel the carrier 50 backwards. See Step 4; FIG. 15B. To prevent the carrier 50 from moving back out of the braking device, an entry side stop, or left stop 330b may be disposed into the bore of the tube 302 to maintain the carrier 50 within the device 300.

Once the carrier is within the device 300, as shown in Step 5, the right gate 310a may be opened to allow fluid flow through the brake tube 302. At this time, the carrier may advance towards the front-end/exit end of the device 300 where it may be engaged by a right stop 330a. When the carrier is to be released, the left outer valve 304b may be closed and the right gate 310a may be fully opened to permit the carrier to pass out of the device. Accordingly, the right stop 330a may be disengaged from the internal bore 302 of the device 300 to permit the carrier to exit the device 300. See Step 6.

Figure 16A:
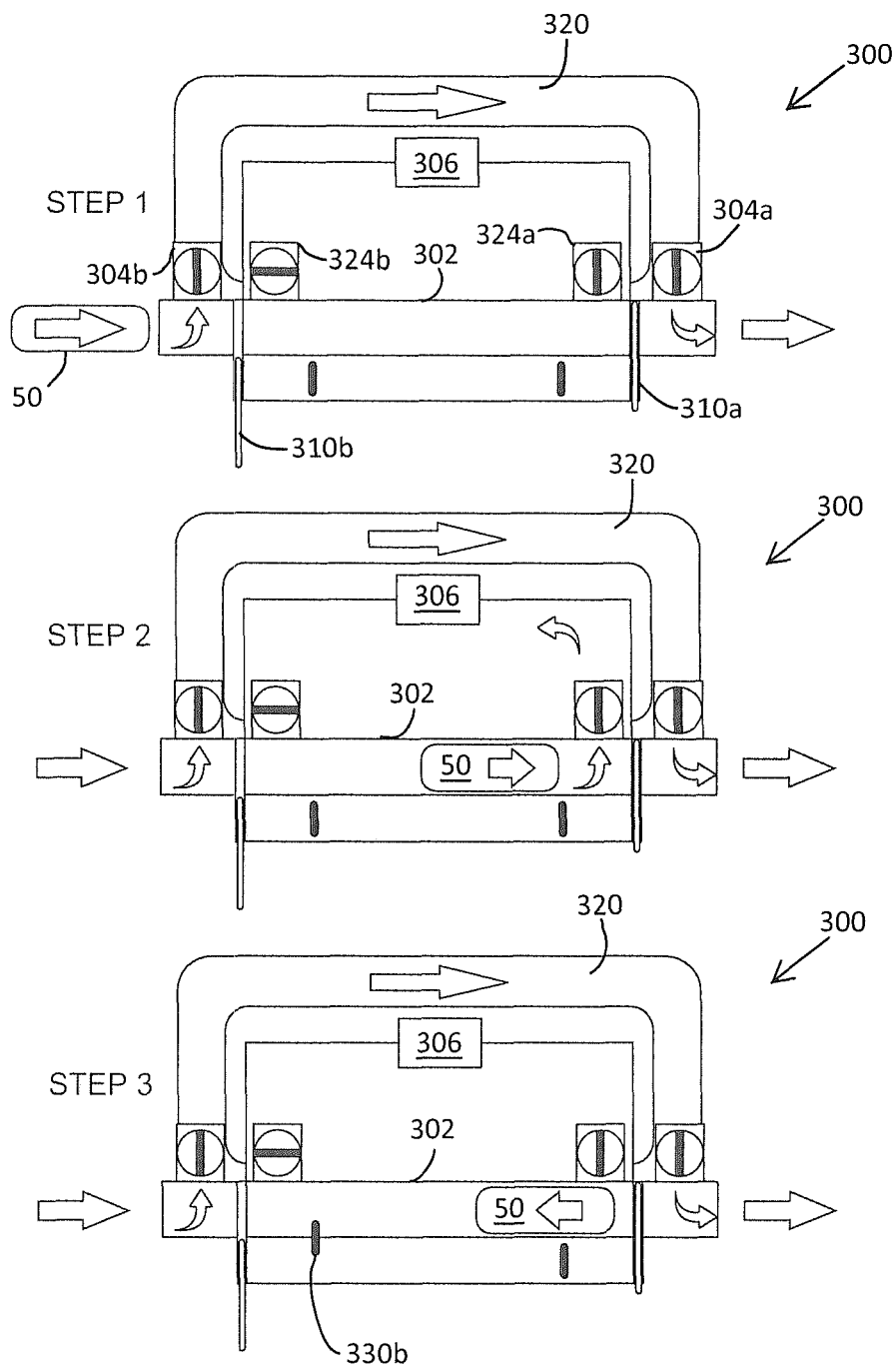
FIGS. 16A and 16B illustrate the operation of the braking device of FIG. 14.
Figure 16B:
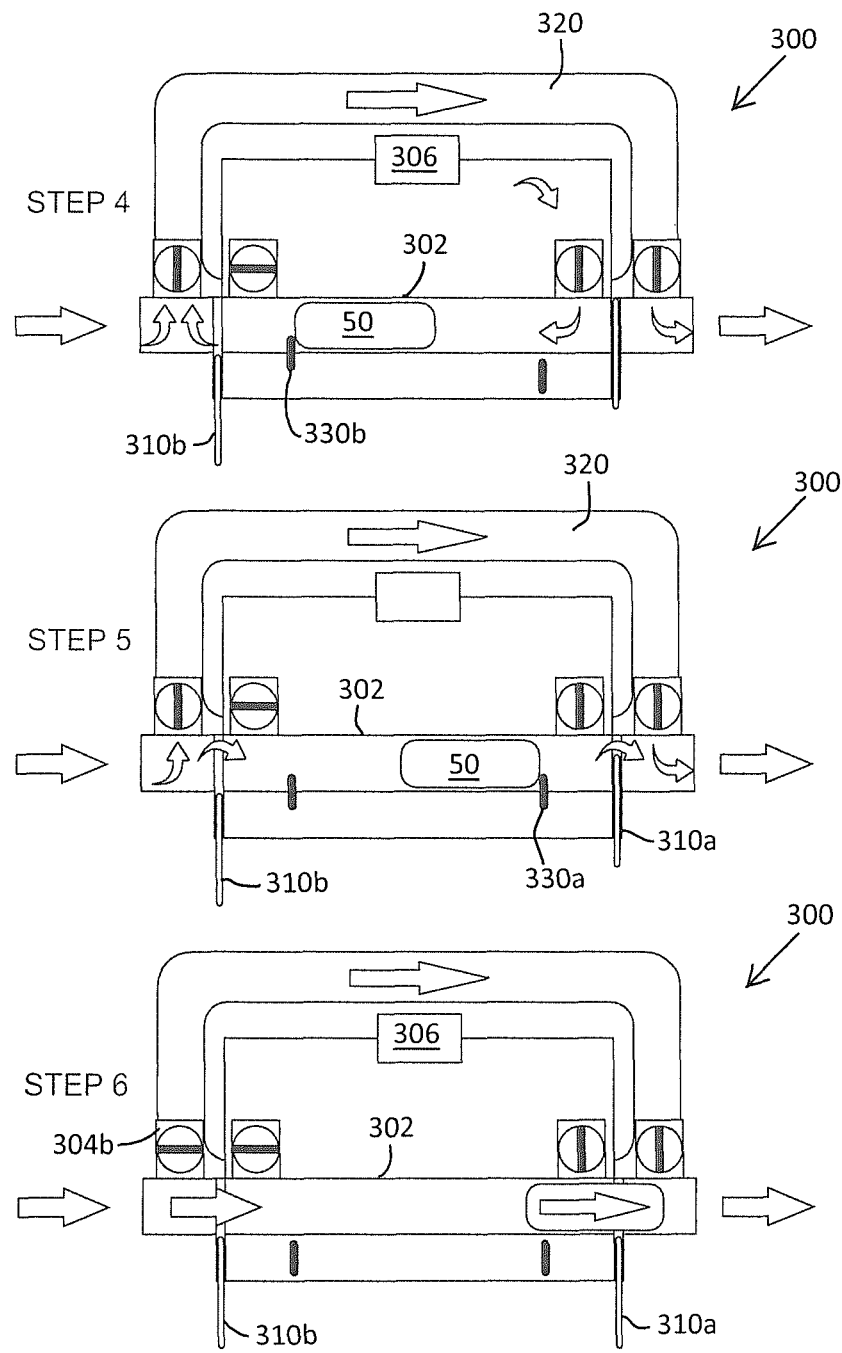
Figure 17:
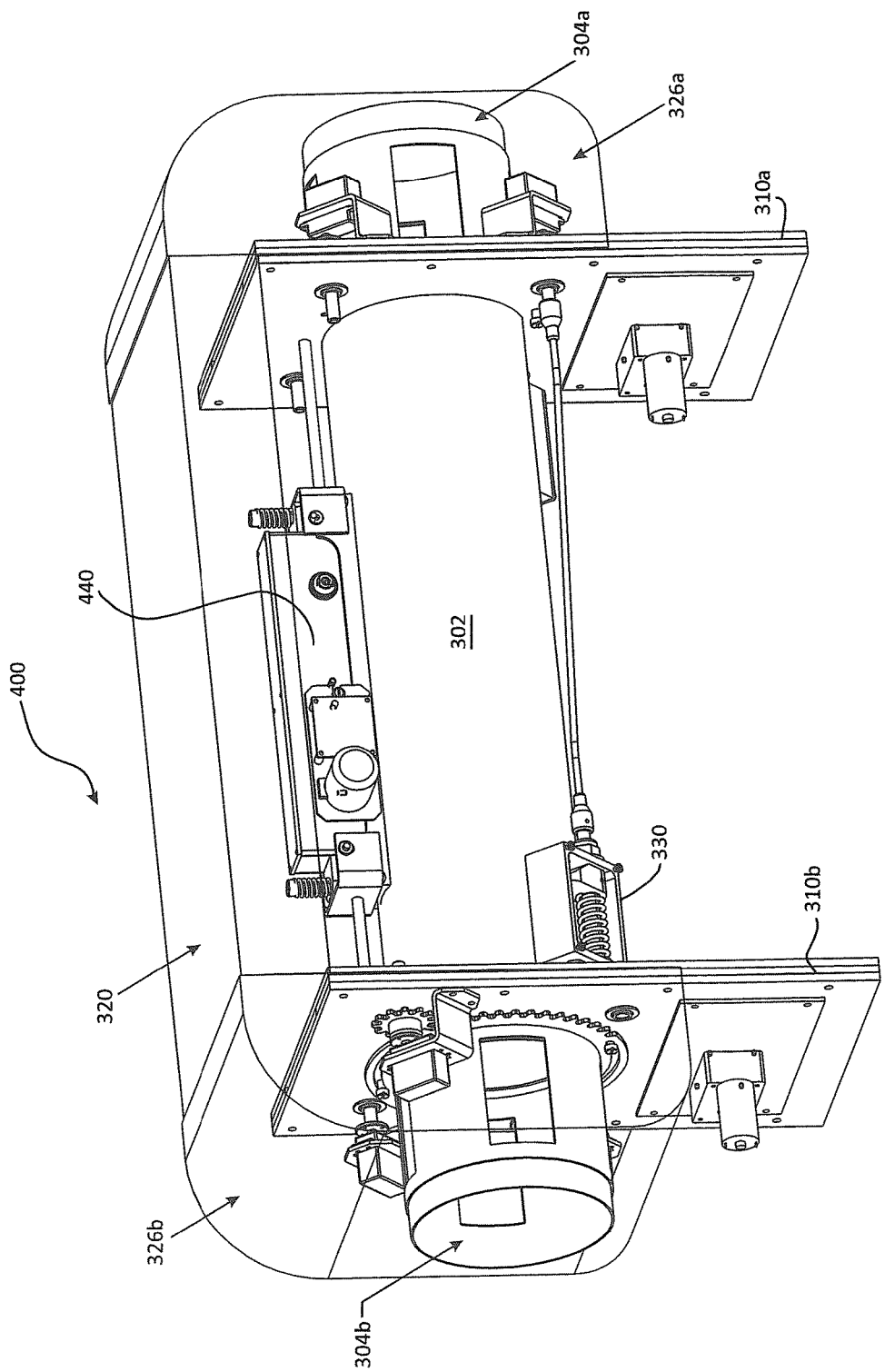
FIG. 17 illustrates another embodiment of a braking device.
Figure 18:
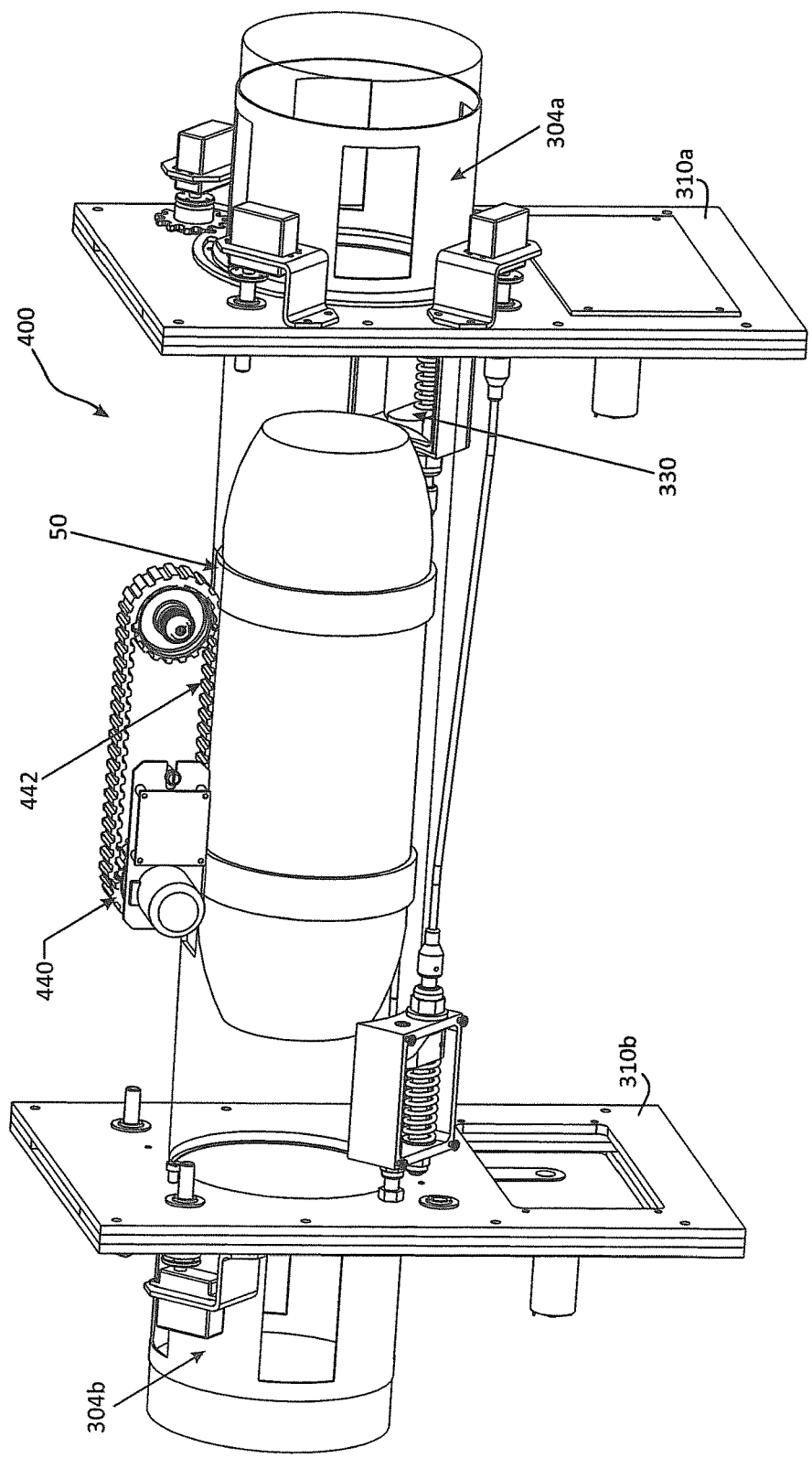
FIG. 18 illustrates the braking device of FIG. 16 with various components removed.
Figure 19:
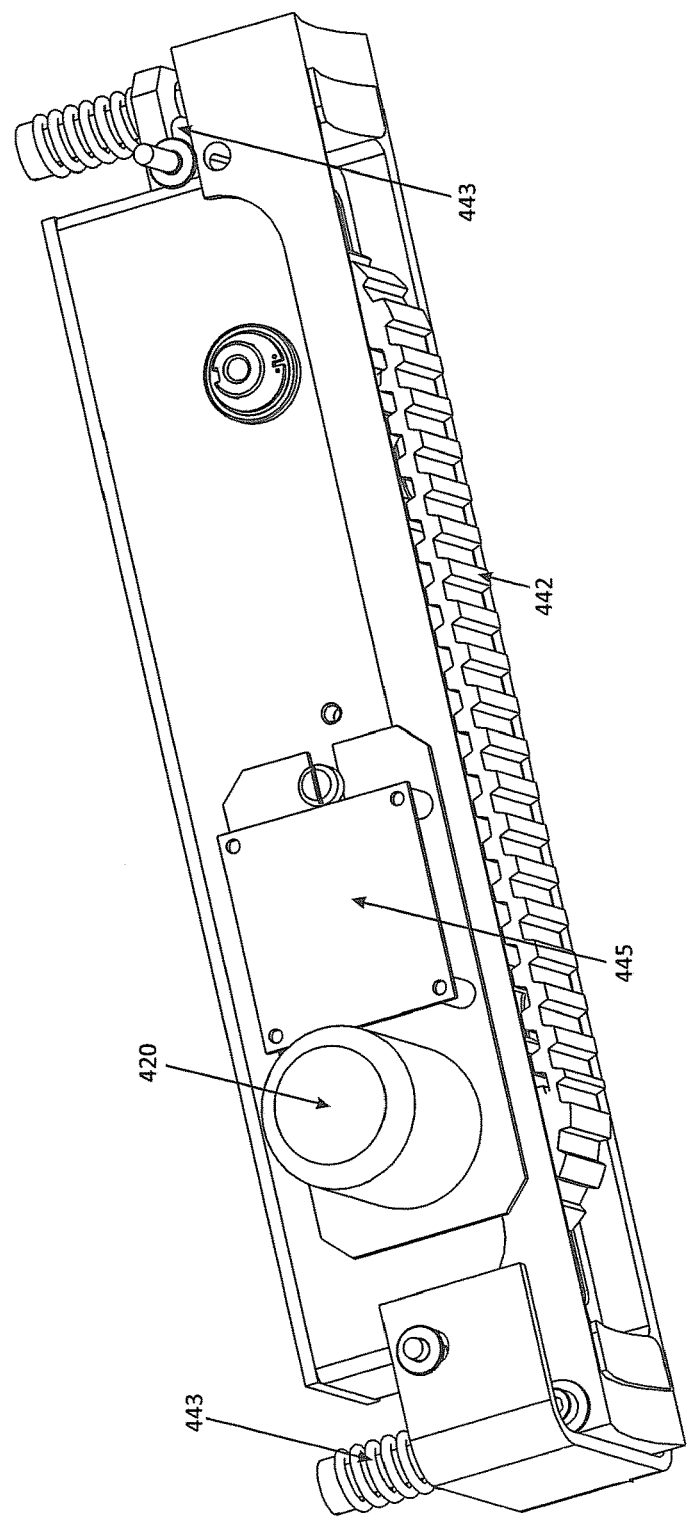
FIG. 19 illustrates a belt assembly that may be utilized with the braking device of FIG. 17.
Figure 20:
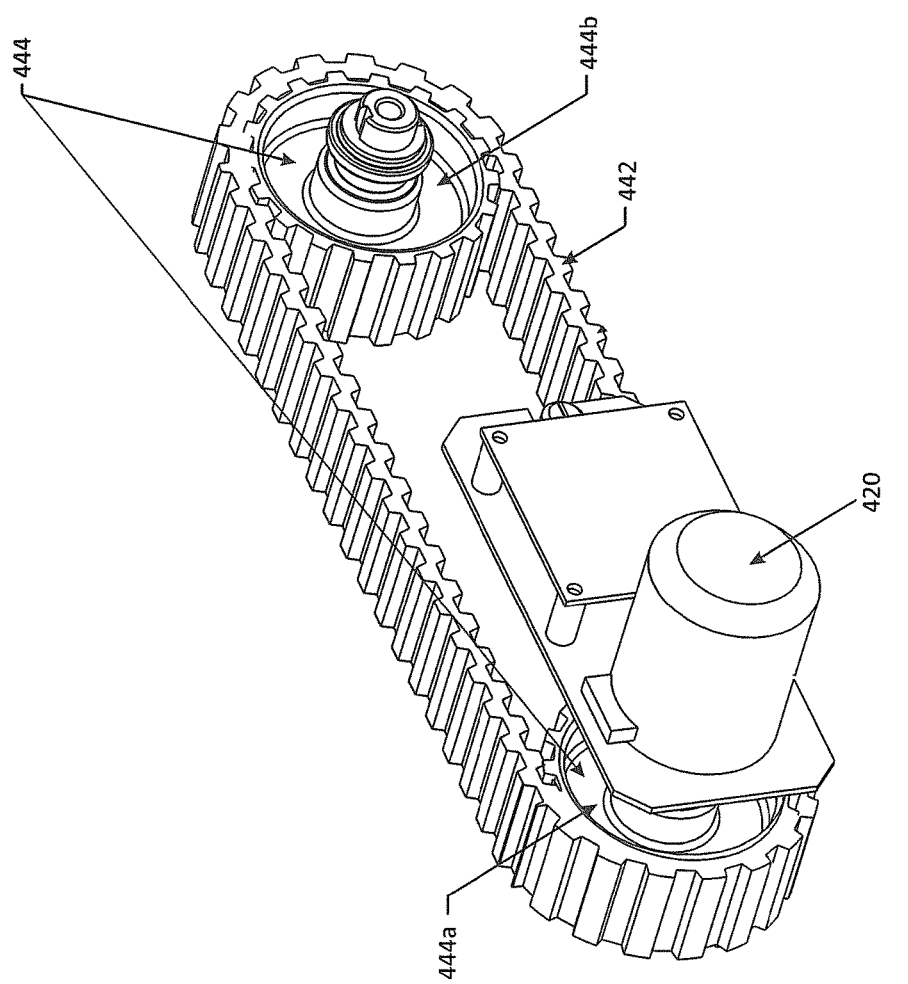
FIG. 20 illustrates the belt assembly of FIG. 19.

FIGS. 16A and 16B illustrates a similar embodiment where the external bypass duct 320 permits fluid flow behind the carrier 50 to bypass around the braking device 300 such that downstream operations may be maintained. As shown in Step 1 (FIG. 16A), the right gate 310a is closed and the right inner valve 324a is opened. Likewise, the external valves 304a, 304b are opened such that the air flow may pass through the bypass duct 320. See Step 1. As the carrier enters into the device 300 air is again displaced into the pressure jacket 306, see Step 2. At this time, the left stop 330b may be disposed into the bore to prevent the pressurized air from expelling the carrier 50 from within the device 300. Also, system air is permitted to pass through the bypass duct 320. See Step 3. Once the carrier is contained within the device 300, the right stop 330a may be engaged into the bore and air flow may be directed through the tube 302 to move the carrier 50 to the right stop 330a as shown in Steps 4 and 5. At this time, at least one of the external valves 304a, 304b may be close to redirect air through the tube 302. Accordingly, the right gate 310a may be opened and the right stop 330a may be disengaged from the bore of the tube 302 to permit the carrier 50 to pass out of the braking device 300. Though show as entering the right side of the device and exiting the left side of the device, it will be appreciated that the device is bi-directional. Further, it should be noted that use of a closed chamber sometimes fails to provide adequate braking force to the carrier.

More specifically, heavy carriers sometimes have enough momentum to pass to the end of a closed chamber. In such an arrangement, the right stop or left stop (i.e., depending on entry direction of the carrier) may be disposed into the bore of the tube 302 to provide a final stopping force to the carrier. Such disposition prevents collision of the carrier with the closed gate 310.

Hybrid Electric and Air Energy Absorber Approach

FIGS. 17-20 illustrate a hybrid electric and air energy absorber braking device 400. As shown in FIG. 17, the device 400 again includes a pneumatic tube 302 that is adapted for receipt between first and second pneumatic tubes within a pneumatic tube system.

Though not illustrated, the pneumatic tube 302 may also be enclosed within a pressure jacket. In the illustrated embodiment, the braking device 400 utilizes first and second external valves 304a, 304b on opposing sides of first and second slide gates 310a, 310b that allow diverting air around the device through a bypass duct 320 as well as creating an air cushion within the tube 302. In this embodiment, the pneumatic tube 302 includes an elongated slot through its sidewall that allows a dampening belt assembly 440 to extend into the interior bore of the pneumatic tube 302. See FIGS. 18-20. As shown, the dampening belt assembly 440 has a continuous belt 442 that extends between first and second pulleys 444a, 444b. The axel of one of the pulleys is connected to a servo motor 420. As with the servo motor 220 discussed in relation to FIG. 4, rotation of the servo motor 420 provides a controllable resistance force that is operative to remove kinetic energy from a carrier 50 passing through a pneumatic tube 302. In this regard, when a front edge of the carrier engages the belt 442, the belt rotates as the carrier continues into the device 400. The motor provides a resistant force to the carrier which slows its forward momentum. In addition, air vented through the belt support aperture in the sidewall of the pneumatic tube 302 may be contained by a pressure jacket (not shown). In this regard, the belt and pressure jacket if utilized allow for providing combined stopping force (pneumatic and electric) over a distance between the first and second ends of the pneumatic tube 302. Again, one or more stops 330 may be provided within the pneumatic tube to finally arrest the forward momentum or rebound momentum of the carrier within the pneumatic tube 402. As illustrated in the various FIG. 17-20, the stop or catch assemblies 330 may be operated by an actuator that operates the stops to disengage the stops from the interior bore of the pneumatic tube.

The belt assembly 440 is operative to provide varying resistance to the carrier. In this regard, the assembly 440 may include a passive or active control 445. As discussed above, the motor provides a resistive force to the rotation of the belt. Further, the harder the carrier hits the belt the more resistance the motor provides. That is, the motor acts in a viscoelastic manner. In order to disengage the belt from the carrier once the carrier is disposed within the pneumatic tube 402, the belt assembly 440 may further include lifting assemblies 443 on one or both ends that allow for selectively engaging and disengaging the belt into and from bore of the pneumatic tube. Alternatively, resistance of the motor may be selected such that it provides significant resistance to high-speed objects while allowing low-speed objects to freely rotate the belt. In this embodiment, air pressure through the interior of the pneumatic tube 302 may be sufficient to restart the movement of the carrier 50 without disengaging the belt there from. In the present embodiment, the lift assembly 443 on each end of the belt assembly is a cam-lift assembly. However, it will be appreciated that any mechanism that allows for raising and lowering the assembly may be utilized.

Hybrid Passive Contactor (Friction) and Air Energy Absorber Approach

Figure 21:
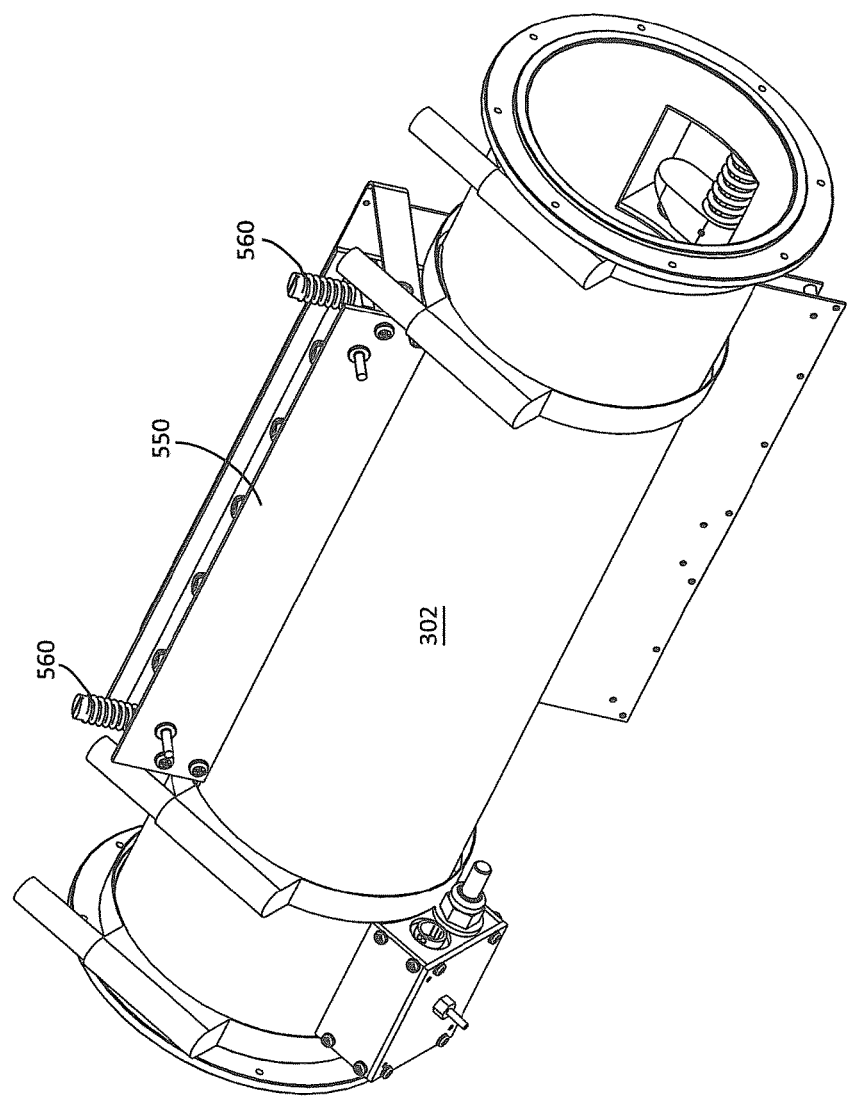
FIG. 21 illustrates another embodiment of a braking device.
Figure 22:
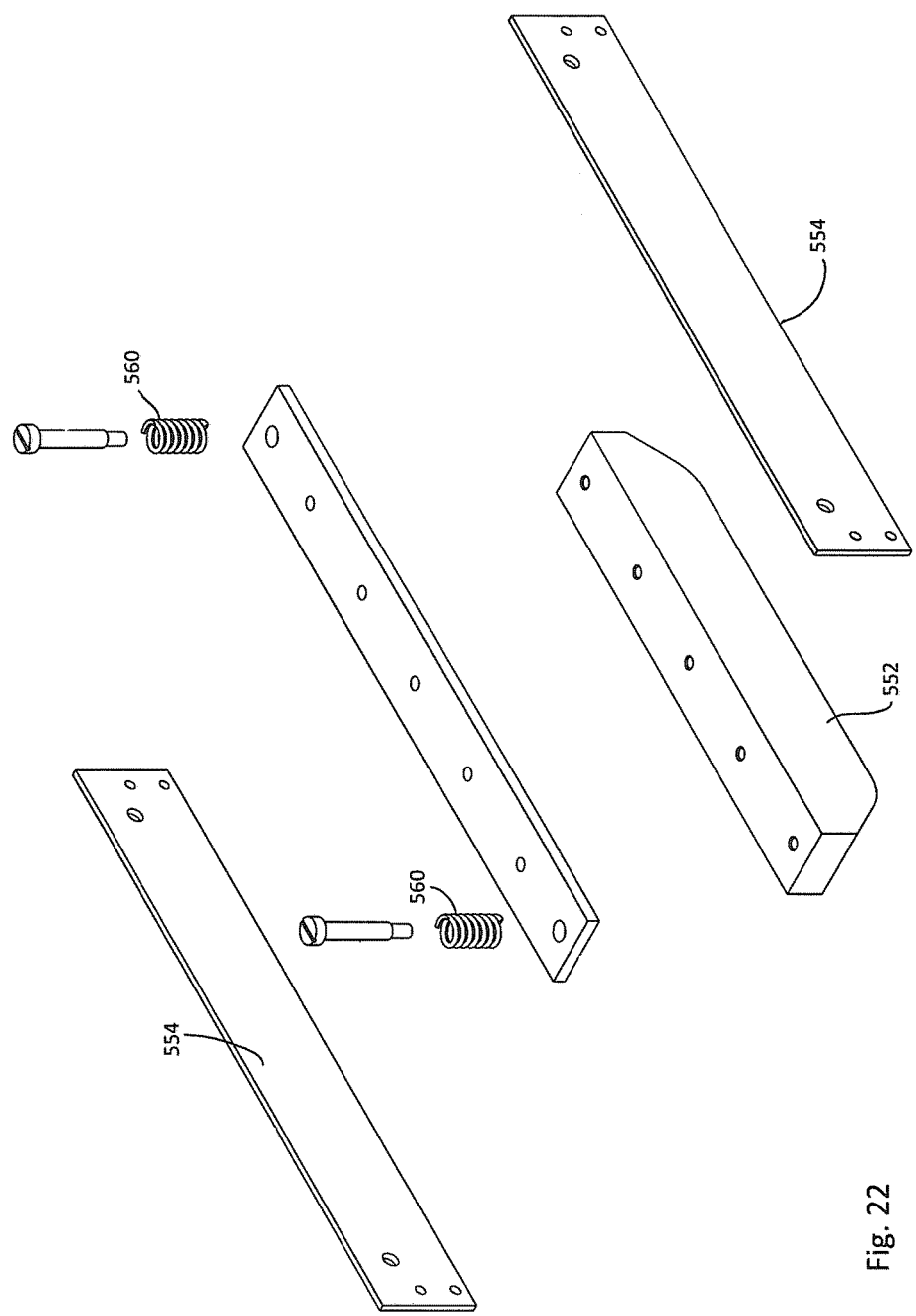
FIG. 22 illustrates an exploded view of a contact block that may be utilized with the barking device of FIG. 21.

FIGS. 21 and 22 illustrate a further embodiment of a hybrid braking device that utilizes a passive friction contact in conjunction with an air energy absorber to provide dual stopping force to a pneumatic carrier. As shown, this embodiment utilizes a braking tube 302 that may be utilized with the braking devices described above. The device is substantially similar to the embodiment of FIG. 17-20 except that the belt assembly is replaced by a friction block assembly 550. As shown, the pneumatic tube 302 again has a slot through an external surface (not shown) that allows for disposing a contact block 552 of the friction block assembly into the bore of the tube. The contact block 552 is formed of a durable yet resilient material. The contact block 552 has first and second tapered ends and extends for substantially the entire length of the aperture through the sidewall of the pneumatic tube 302. In the present embodiment, the contact block 552 is spring loaded on both ends by first and second springs 560. In this regard, frame elements 554 position the block 552 relative to the slot in the pneumatic tube such that a portion of the block 552 is disposed within the interior bore of the pneumatic tube 302. More specifically, first and second spring assemblies 560 urge a bottom edge of the block 552 into the pneumatic tube 302. Accordingly, when a carrier enters into the pneumatic tube 302, the front tapered edge of the contact block 552 compresses the spring assemblies as the carrier moves along the length of the pneumatic tube 302. The friction of the contact slows the carrier. As above, air may pass out of the elongated slot in the pneumatic tube 302 into a pressure jacket providing further pneumatic stopping force. In the latter regard, it will be appreciated that a gate assembly (not shown) may be closed on the exiting end of the pneumatic tube.

In further embodiments, the devices of 17-22 may be modified to allow removal of the belt or friction block from the internal bore of the braking device. If braking is not needed or desired, removal of the belt/block from the internal bore of the device permits a carrier to pass through the device unimpeded.

It will be appreciated that the disclosed embodiments are for purposes of illustration only and that each of the devices may be modified. For instance, each of the devices may incorporate features from one or more of the other devices.

Enhanced PTS Functionality

Figure 23:
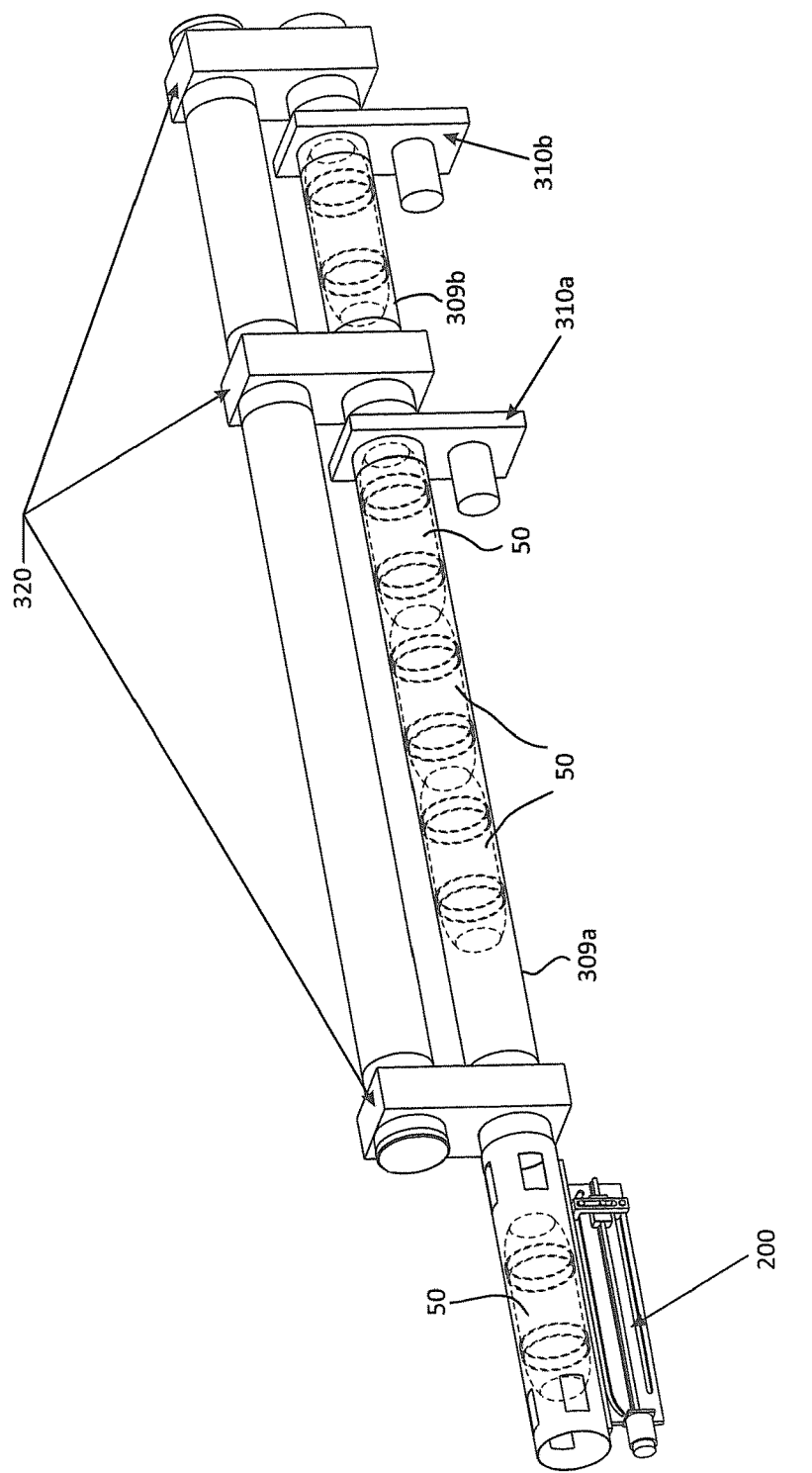
FIG. 23 illustrates use of a braking device to form a queue.

The disclosed braking devices allow for various enhanced carrier handling functions within a pneumatic tube system. For instance, the braking devices may be stacked within the system to provide functions that were previously performed by TCU units, which have typically been significantly more complex and expensive than the disclosed devices. For instance, as shown in FIG. 23, one or more braking devices 300 may be aligned with one or more pneumatic tube section(s) 309 and one more slide gates 310 to provide a queuing system. Though illustrated with the braking device illustrated with FIGS. 4-9, it will be appreciated that any of the braking devices may be so arranged. In such an arrangement, multiple carriers may be stored inline. That is, a braking device 200 may stop incoming carriers 50 and then release the carries into a queue formed by the pneumatic tube 309 and one or more slide gates that allows for stopping carriers. This slide gate may be substantially identical to the slide gate describe in relation to FIG. 11 or may utilizes a modified gate. In the latter regard, the modified gate may, instead of completely blocking the internal bore of the tube, may comprise a fork that allows for separating adjacent carriers while permitting some airflow through the internal bore of the tube 309. Along these lines, if air flow is passing through the tube 309a, such air flow may propel a set carriers forward. The slide gate 310a may be use to separate the most forward carrier from the remaining carriers. Further, it will be appreciated that various bypass ducting 320 may allow for passing air around the entire queue or injecting air at desired locations. For instance, after separating one carrier from a set of carriers at a first slide gate 310a, it may be necessary to provide airflow behind the separated carrier to continue its processing.

Figure 24:
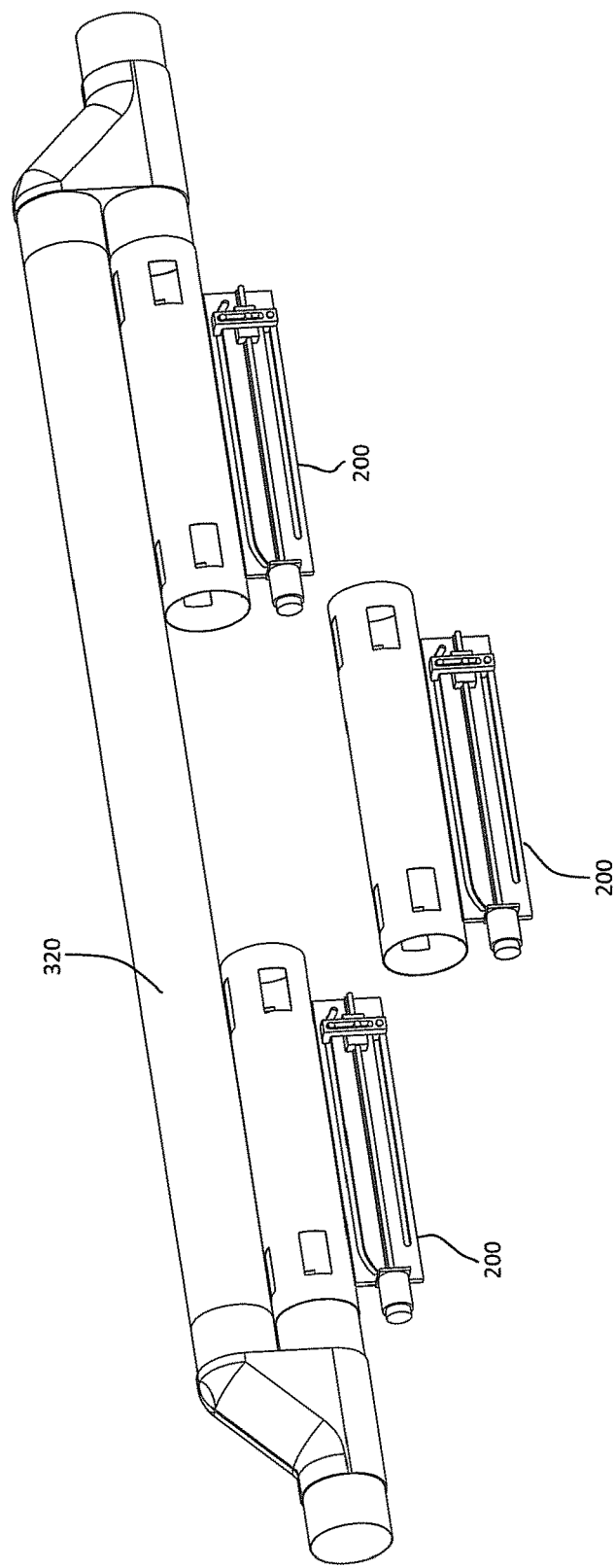
FIG. 24 illustrates use of multiple braking devices to form a queue.

As shown in FIG. 24, the multiple braking devices 200 (or 300) may be aligned to form a queueing device. Again, such a device may include one or more bypass ducts to bypass around the device and/or around individual braking devices. In either embodiment of FIG. 23 or 24, multiple carriers may be queued at locations within the pneumatic tube system.

One enhanced function provided by the in-line braking devices is the ability to move two carriers during a single blower cycle. For instance, in a case where two carriers are awaiting transport in a single zone (e.g., stations 18X and 18Y each have a carrier awaiting transport; See FIG. 1), processing of one of the carriers must await retrieval and delivery of the other carrier. In this example, the blower 22A of Zone A initially processing a carrier 50A (e.g., destined for Zone B) in station 18X must complete two cycles before processing a carrier awaiting delivery in station 18Y (e.g., destined for Zone C). For example, the blower 22A must execute a vacuum cycle to move the carrier in station 18X to the turn-around transfer unit 12A and then execute a pressure cycle to move the carrier out of the turn-around transfer unit 12A towards its destination. Until these two cycles are completed, the processing of the second carrier 50B, in station 18Y, is delayed. Incorporation of the carrier braking devices into the PTS allows moving both carriers located in stations 18X and 18Y out of those stations to the turn-around transfer unit 12A, during a single vacuum blower cycle. Likewise, both carriers may be moved out of the turn-around transfer unit 12A during a single pressure blower cycle. However, to effect movement of multiple carriers during a single blower cycle, the system requires a means to handle multiple carriers received at the turn-around transfer unit 12A.

The transfer unit 12A is a diverting unit that allows for transferring a received carrier between any one of multiple inlet/outlet ports that enter into one end of the transfer unit 12A. An air source port is disposed on an opposite end of the transfer unit 12A, which is connectable to an air source/blower 22A that provides bi-directional air flow. In operation, a transfer tube in the turn-around transfer unit 12A is positioned adjacent to one of the inlet/outlet ports and air flow is initiated into the transfer unit 12A (e.g., a blower may provide airflow in a first direction) such that a carrier 50 may draw into the transfer unit 12A via the connected port. When braking devices 600A, 600B are disposed on the airport side of the transfer unit, a carrier 50 may move into the transfer unit and out of a head end port of the turn-around transfer unit. At this time, the carrier passes into what is referred to as a sequencer, which is made up of two or more in-line braking devices 600A, 600B.

Figure 25A:
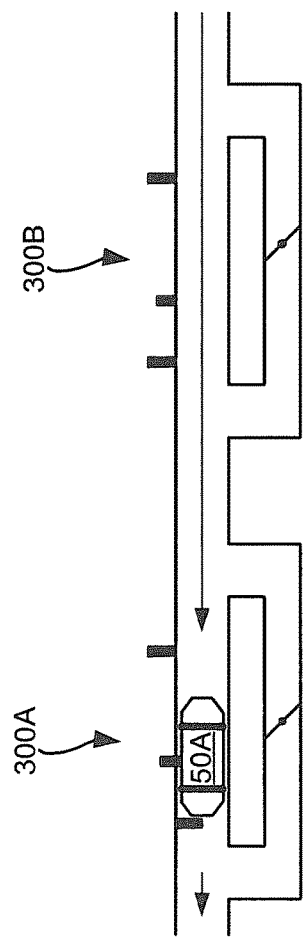
FIGS. 25A, 25B and 25C illustrate use of multiple braking devices to form a sequencer.
Figure 25B:
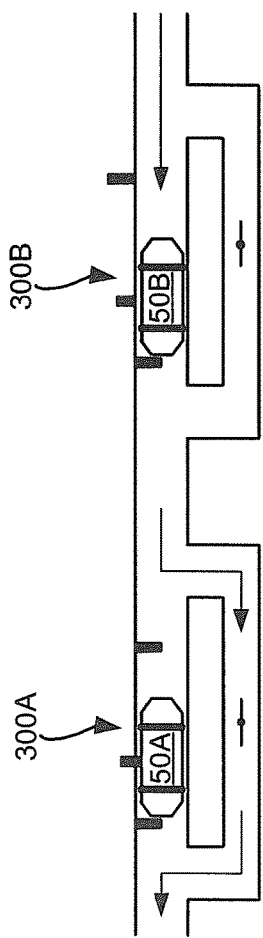
Figure 25C:
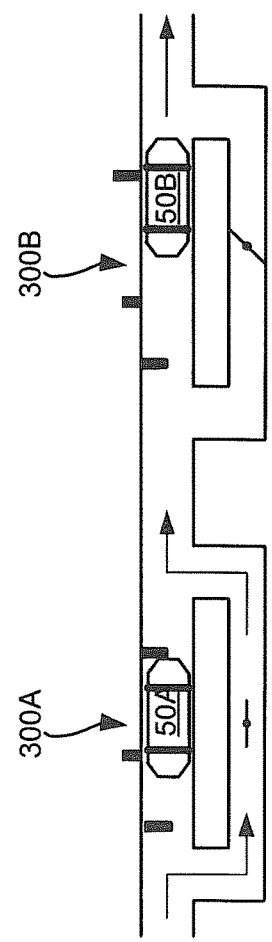

FIGS. 25A-C illustrate one embodiment of a sequencer formed of a pair of the in-line braking devices. In this embodiment, the carriers are received and stored in series in first and second (or potentially additional) braking devices 300A, 300B. The braking devices are fluidly connectable to an air port or headend of the turn-around transfer unit (not shown). Opposing ends of the braking devices are connectable to the blower, which provides bi-directional airflow through the braking devices. During operation, the air source/blower may provide airflow into the transfer unit 12A and into the sequencer/braking devices 300A, 300B such that a first carrier may pass into one of the braking devices. Once the first carrier 50A is received within one of the braking devices 300A and secured therein, a second carrier 50B may be received in the second braking device 300B.

Once the sequencer has received two or possibly more carriers (e.g., if additional barking devices are used), those carriers may be displaced from the sequencer via the application of airflow in an opposing direction as illustrated in FIG. 23C. Likewise, if both carriers are slated for delivery to a common location (e.g., a downstream zone) a first carrier may be launched through the diverter 12A and the second carrier may be launched sequentially after the first carrier. In this regard, two carriers may be delivered through commonly aligned pneumatic tubes. Furthermore, the system may be operative to delay release of a second or subsequent carrier in order to provide desired spacing between the carriers. In this regard, a first carrier may be dispatched and after a delay the second carrier dispatched providing enough time between the expulsions of the carriers to alter an alignment of a downstream transfer unit to allow delivery of the second carrier to a different location.

Returning to the example above, the system controller operates to interconnect the transfer unit 20A to a first of the Stations (e.g., Station 18X) to provide a pneumatic path between the turnaround transfer unit 12A and the station 18X. See FIGS. 1 and 25A. At this time the air source or blower 22A provides vacuum such that the carrier 50A is drawn out of Station 18X. Once the carrier is identified as passing through the transfer unit 20A (e.g., using RFID, bar code etc.), the transfer tube of the transfer unit 20A may be aligned with the Station 18Y in order to begin transport of the carrier 50B within Station 18Y to the turnaround transfer unit 12A. Though illustrated as having a short pneumatic tube section 7 extending between the pass-through transfer unit 20A and the turnaround transfer unit 12A, it will be appreciated that many instances significant distances exist between the transfer units 20A and the turnaround transfer units 12A. That is, in actual implementations, it is common for all blowers and turn-around transfer units to be co-located in a common location. In this regard, significant distances may exist in the turnaround transfer units and pass through transfer units, interconnecting a plurality of stations.

The ability to identify when the carrier from 18X passes through the pass-through transfer unit 20A allows for redirecting the transfer unit 20A and applying vacuum to station 18Y while the carrier of station 18X traverses the connecting pneumatic tube 7 between the pass-through transfer unit 20A and the turnaround transfer unit 12A. That is, both carriers may be in motion towards the turnaround transfer unit 12A simultaneously. As will be appreciated, such simultaneous movement of the carriers originally located in Stations 18X and 18Y further reduces the total time to transfer both carriers. Further, the ability to identify the location of the carriers (e.g., utilizing antennas or readers located in the transfer units, stations, tubes etc.) may also allow for providing desired spacings between the carriers. This allows the sequencer to receive the first carrier in a first braking device and prepare a second braking device to receive the second carrier.

Once both carriers are received at the sequencer, a carrier path (e.g., inter-zone transfer) between Zone A and the downstream Zones B and C may be established. Initially, in the presented example, the second opposing transfer unit 120B of the inter-zone transfer device 100 is connected to Zone C. At this time, the turn-around transfer unit 112A may align with a pneumatic path to deliver the carrier 50B to zone C. The second carrier 50B may proceed out of the turnaround transfer unit 12 and begin transit to zone C. At this time, the first carrier 50A (i.e., destined for Zone B) may be released. As will be appreciated, the controller may delay the release of the second carrier to provide adequate spacing between the carriers such that downstream components may be realigned between the arrivals of the carriers. In any case, the first carrier may transit through the interzone transfer unit 100 and through the transfer unit 120B and into Zone C until it is received at TCU 14C. Once received by Zone C, the transfer unit 120B may realign to connect with Zone B prior to the arrival of the first carrier 50A (which may already be in transit) passing through the transfer unit 120B. Accordingly, once the transfer unit 120B is realigned (i.e., during transit of the first carrier) the first carrier may pass through transfer unit 120B and into Zone B. As will be appreciated, the ability to handle multiple carriers at the turn-around transfer unit 120A allows for moving two or potentially more carriers during each vacuum cycle and each pressure cycle. Accordingly, the system is more efficiently utilized and the total throughput of the system is increased.

FIGS. 26A and 26B illustrate a further use of an in-line braking device in a pneumatic tube system. Specifically, these figures illustrate a parallel storage/bypass unit 500 (hereafter 'bypass unit'). As shown, the bypass unit 500 includes first and second transfer units 412A, 412B in a back-to-back configuration. As shown, each transfer unit 412 is a diverting unit that allows for transferring a received carrier between any a single inlet port 406 to any of four inlet/outlet four ports 408A-408D (only two shown in side view). Though discussed in relation to a four port device, it will be appreciated that other devices may utilize more or fewer inlet/outlet ports. To effect transfer of a received carrier between two of the inlet/outlet ports, the transfer units 412 each include a transfer tube 424. The transfer tube 424 is a bent or offset tube that may be selectively positioned between the head end port 406 and any one of the four inlet/outlet ports, each of which, in the present embodiment is connected to corresponding port of the other transfer unit. The transfer tube 424 is typically a curved tube having a head end rotatively coupled to the head end port 406 and a transfer end that is operative to rotate into an adjacent position with any one of the inlet/outlet ports. Generally, a motor (not shown) is interconnected proximate to the head end of the transfer tube 424 that is operative to rotate the tube utilizing, for instance, sprockets, gears, etc.

As shown, each of the inlet outlet ports 408A-408D of the first transfer unit 412A are connected to a corresponding inlet/outlet ports in the other transfer unit 412B. At least one of the connecting tubes includes a carrier brake device 300. As will be appreciated all of the connecting tubes may include a carrier brake device. In the illustrated embodiment, one of the connecting lines 440 is a pass through line without a carrier braking device. In any embodiment, the bypass unit 400 allows for two carriers to pass by one another in a pneumatic tube. That is, a first carrier 50A proceeding a first direction may be 'parked' in the braking device 300. See FIG. 26A. That is, at least one of the transfer tubes 424 (e.g. the right transfer tube as illustrated) may be aligned to direct the first carrier 50A into the braking device 300. At this time, the first carrier 50A may be stopped and maintained within the braking device 300 and the transfer tubes may be realigned to permit a second carrier 50B to pass through the device 500. See FIG. 26B. As will be appreciated, this may allow for expediting delivery of the second carrier 50B to its final destination. Such functionality has significant importance in hospital usage. For instance, high importance carriers (e.g., STAT carriers) may proceed through a PTS bypassing lower priority carriers.

In addition to providing bypass functionality, it will be appreciated that the bypass device 500 may also be utilized as a storage device. That is, the bypass/storage device 500 may be incorporated into a PTS at any location where storage is desirable. In this regard, the device 500 may allow for holding one or more carriers within the system while still permitting upstream and downstream locations of the system to continue operation. For instance, such a storage device 500 may be disposed between the carrier station and a zone blower. In this regard, the carrier may be moved from a carrier station into the storage device 500 and await delivery (e.g., availability of destination locations and/or delivery at a desired time) while still permitting deliveries to and from the sending station.

Figure 27:
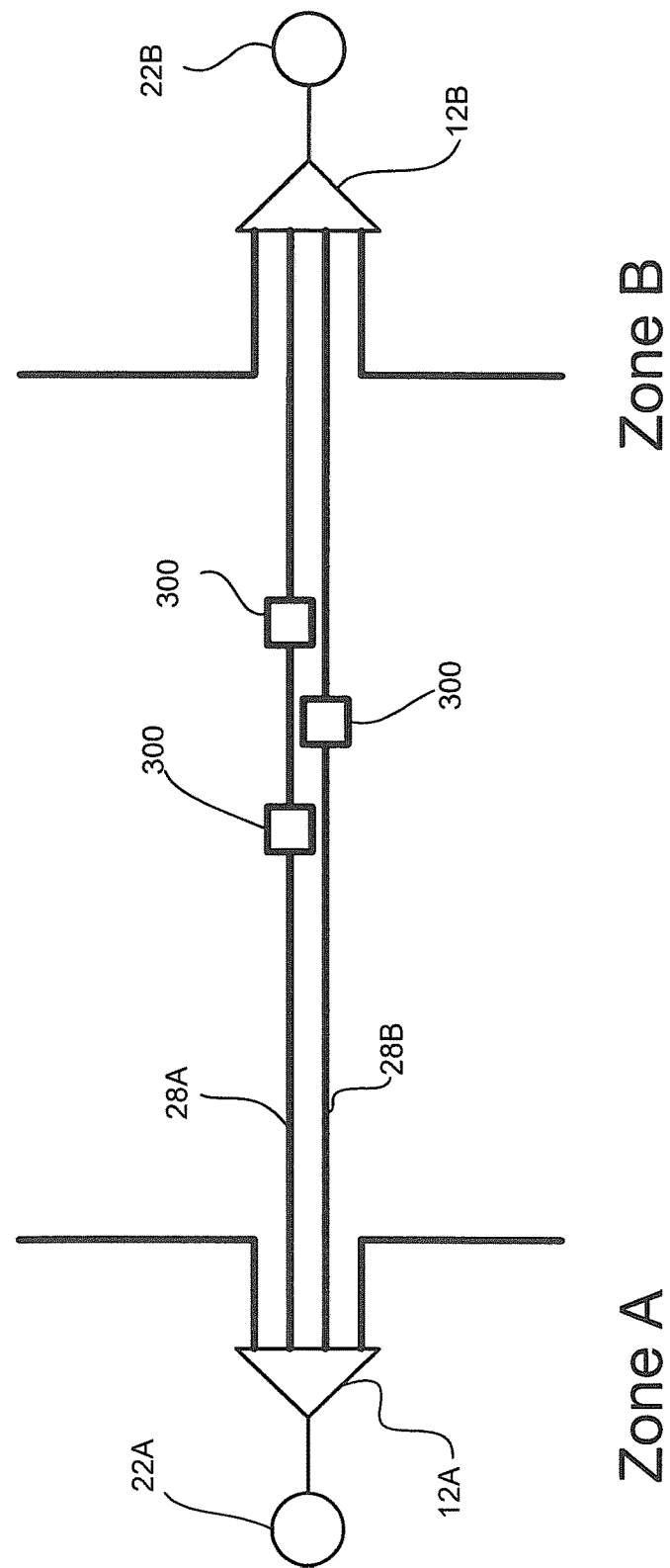
FIG. 27 illustrates use of braking devices in an inter-zone connection.

FIG. 27 illustrates another potential use of the in-line braking device(s). In this use embodiment, first and second zones A and B each have a blower 22A and 22B and turnaround transfer units 12A and 12B. In the illustrated embodiment, each of the turnaround transfer units includes a plurality of pneumatic tubes that are connected to various locations within their own zones. In addition, the illustrated embodiment shows two inter-zone connections 28A and 28B. However, a single inter-zone connection may exist between the two zones. These inter-zone connections form a direct link between the two zones of the pneumatic tube system. Previously, inter-zone connections were of sufficient length to allow the carrier being transported between the zones to coast to a stop. For instance, if the carriers being delivered from zone A to zone B, the first blower 22A would dispel the carrier out of the first turnaround transfer unit 12A into one of the inter-zone connections 28. Once the carrier is displaced into the inter-zone connections 28, the first blower would discontinue providing pressurized airflow to the inter-zone connection 28. The carrier within coast to a stop. At a later time, the second blower 22B would apply vacuum to the inter-zone connection 28 in order to draw the carrier into the second turnaround transfer unit 12B. This previous arrangement required an inter-zone connection of considerable length to allow carrier to coast to a stop. As shown in FIG. 27, each inter-zone connection 28 includes one or more braking devices 300. In this arrangement, the length of the inter-zone connection may be significantly shortened (e.g., 10 feet) as it is possible to controllably stopped carrier passing through the inter-zone connection. Further, the ability to put multiple braking devices into the inter-zone connection (e.g., 28A) allows for queuing multiple carriers in the inter-zone connection between the two zones.

Figure 28:
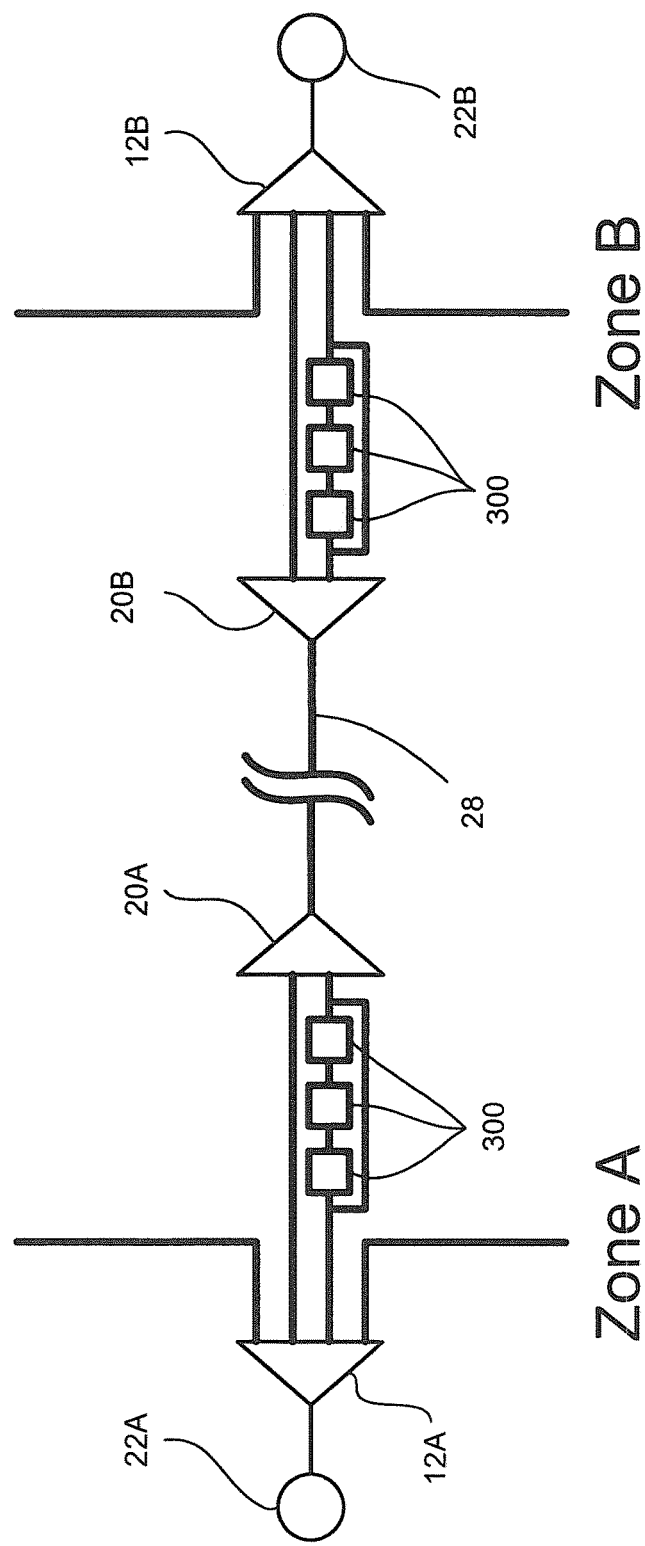
FIG. 28 illustrates use of braking devices a queue for an inter-zone connection.

FIG. 28 illustrates another use embodiment were first and second zones A and B are connected by a single inter-zone connection 28. Commonly, such inter-zone connections 28 may be a significant length and have limited access. For instance, such inter-zone connection 28 may be disposed below ground (e.g., below a street). In such instances, replacing such an inter-zone connection with dual connections that allow for bidirectional travel is difficult and expensive. The embodiment of FIG. 28 allows for queuing multiple carriers in a queue formed of multiple braking devices 300. In this arrangement, the turnaround transfer units 12 of each of the zones are connected to a queue of three braking devices 300. More or fewer braking devices may be utilized. In operation, this allows for queuing three carriers such that these three carriers may be delivered during a single blower cycle. For example, zone A may store three carriers slated for delivery to zone B in the queue defined by the braking devices 600A. Once the three carriers are ready for delivery, they may be released (e.g., simultaneously or sequentially) such they pass through the inter-zone connection 28 to zone B. These carriers may be received within the braking devices 300 B in zone B. In the illustrated embodiment, the first and second zones A and B further include optional transfer units 20A and 20B. These transfer units 20 are each connected to the queue of braking devices and provided direct connection to the turnaround transfer units 12. In this regard, a high priority carrier may bypass the cue and proceed directly between the two zones A and B.

The foregoing description of the presented inventions has been presented for purposes of illustration and description. Furthermore, the description is not intended to limit the inventions to the forms disclosed herein. Consequently, variations and modifications commensurate with the above teachings, and skill and knowledge of the relevant art, are within the scope of the presented inventions. The embodiments described hereinabove are further intended to explain best modes known of practicing the inventions and to enable others skilled in the art to utilize the inventions in such or other embodiments and with various modifications required by the particular application(s) or use(s) of the presented inventions. It is intended that the appended claims be construed to include alternative embodiments to the extent permitted by the prior art.

What is claimed:

1. A brake for use in a pneumatic tube carrier system, comprising:
   a pneumatic tube having an internal bore extending between a first open end and a second open end, wherein said internal bore is sized to accommodate the passage of a pneumatic carrier there through;
   a first gate assembly disposed along a length of the pneumatic tube at a first location, wherein said first gate assembly is configured to move a first plate into and out of said internal bore to open and close said internal bore;
   a second gate assembly disposed along a length of the pneumatic tube at a second location, wherein said second gate assembly is configured to move a second plate into and out of said internal bore to open and close said internal bore;
   a first valve disposed between said first open end and said first gate assembly and a second valve disposed between said second open end and said second gate assembly, said valves configured to controllably open and close first and second ports in a sidewall of said pneumatic tube between said first and second ends;
   ducting extending external to said internal bore between said first valve and said second valve, wherein when said first and second valves are open, pneumatic system air flow can bypass said gate assemblies for continuing downstream operations in the pneumatic tube carrier system; and
   a controller configured to controllably move said gate assemblies and said valves to create an air cushion in front of a carrier upon arrival of a carrier into said pneumatic tube.

2. The device of claim 1, wherein first valve is disposed proximate to said first gate assembly and said second valve is disposed proximate to said second gate assembly.

3. The device of claim 2, further comprising:
   a third valve and a fourth valve configured to controllably open and close third and fourth ports in the sidewall of said pneumatic tube between said first and second ends, wherein said third and fourth valves are disposed between said first and second gate assemblies.

4. The device of claim 3, further comprising:
   a pressure jacket disposed outside of at least a portion of said pneumatic tube, wherein said pressure jacket is configured to at least partially contain air displaced from said internal bore from at least one of said third and fourth valves.

5. The device of claim 1, further comprising:
   first and second spring loaded stops, each selectively disposable into said internal bore of said pneumatic tube.

6. The device of claim 5, wherein said first and second spring loaded stops are disposed between said first and second gate assemblies.

* * * * *